United States Patent
Hirano et al.

(10) Patent No.: US 11,902,418 B2
(45) Date of Patent: Feb. 13, 2024

(54) REGISTRATION DEVICE, SEARCH OPERATION DEVICE, AND DATA MANAGEMENT DEVICE

(71) Applicant: MITSUBISHI ELECTRIC CORPORATION, Tokyo (JP)

(72) Inventors: Takato Hirano, Tokyo (JP); Yutaka Kawai, Tokyo (JP); Yoshihiro Koseki, Tokyo (JP); Satoshi Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/750,902

(22) Filed: May 23, 2022

(65) Prior Publication Data

US 2022/0286271 A1    Sep. 8, 2022

Related U.S. Application Data

(63) Continuation of application No. PCT/JP2020/000894, filed on Jan. 14, 2020.

(51) Int. Cl.
*H04L 29/06* (2006.01)
*H04L 9/06* (2006.01)
(Continued)

(52) U.S. Cl.
CPC ............ *H04L 9/0618* (2013.01); *H04L 9/065* (2013.01); *H04L 9/0819* (2013.01)

(58) Field of Classification Search
None
See application file for complete search history.

(56) References Cited

U.S. PATENT DOCUMENTS

2004/0174999 A1   9/2004   Iwamura et al.
2010/0020966 A1   1/2010   Hata et al.
(Continued)

FOREIGN PATENT DOCUMENTS

JP   2004-297778 A   10/2004
JP   2009-135871 A    6/2009
(Continued)

OTHER PUBLICATIONS

International Search Report (PCT/ISA/210) issued in PCT/JP2020/000894 dated Mar. 31, 2020.
(Continued)

*Primary Examiner* — Lisa C Lewis
(74) *Attorney, Agent, or Firm* — Birch, Stewart, Kolasch & Birch, LLP

(57) ABSTRACT

A registration device (500) accepts plaintext, attribute information of a user having an authority of referring to the plaintext, and a registration key for use in generating a user key for generating a search query. The registration device generates aggregate information indicating one or more aggregate values, by aggregating a plurality of attribute values included in the attribute information. The registration device generates generalized information indicating a plurality of generalized values for each aggregate value by generalizing each aggregate value included in the aggregate information. The registration device generates ciphertext data including the plaintext encrypted, by using the plaintext, the attribute information, the generalized information, and the registration key. The registration device registers the ciphertext data in a database.

2 Claims, 26 Drawing Sheets

(51) Int. Cl.
*H04L 9/08* (2006.01)
*G06F 21/00* (2013.01)

(56) References Cited

U.S. PATENT DOCUMENTS

| | | |
|---|---|---|
| 2011/0228930 A1 | 9/2011 | Karroumi et al. |
| 2012/0121088 A1 | 5/2012 | Hata et al. |
| 2014/0372433 A1* | 12/2014 | Dougherty ............... G06F 16/94 |
| | | 707/736 |
| 2016/0048690 A1* | 2/2016 | Tanishima ............. G16B 50/40 |
| | | 713/193 |
| 2020/0351081 A1 | 11/2020 | Hirano et al. |
| 2021/0173957 A1 | 6/2021 | Kawai et al. |
| 2022/0277100 A1* | 9/2022 | Hirano ..................... G09C 1/00 |

FOREIGN PATENT DOCUMENTS

| | | |
|---|---|---|
| JP | 2011-528521 A | 11/2011 |
| WO | WO 2018/131129 A1 | 7/2018 |
| WO | WO 2019/142651 A1 | 7/2019 |

OTHER PUBLICATIONS

Written Opinion (PCT/ISA/237) issued in PCT/JJP2020/000894 dated Mar. 31, 2020.

* cited by examiner

Fig. 5
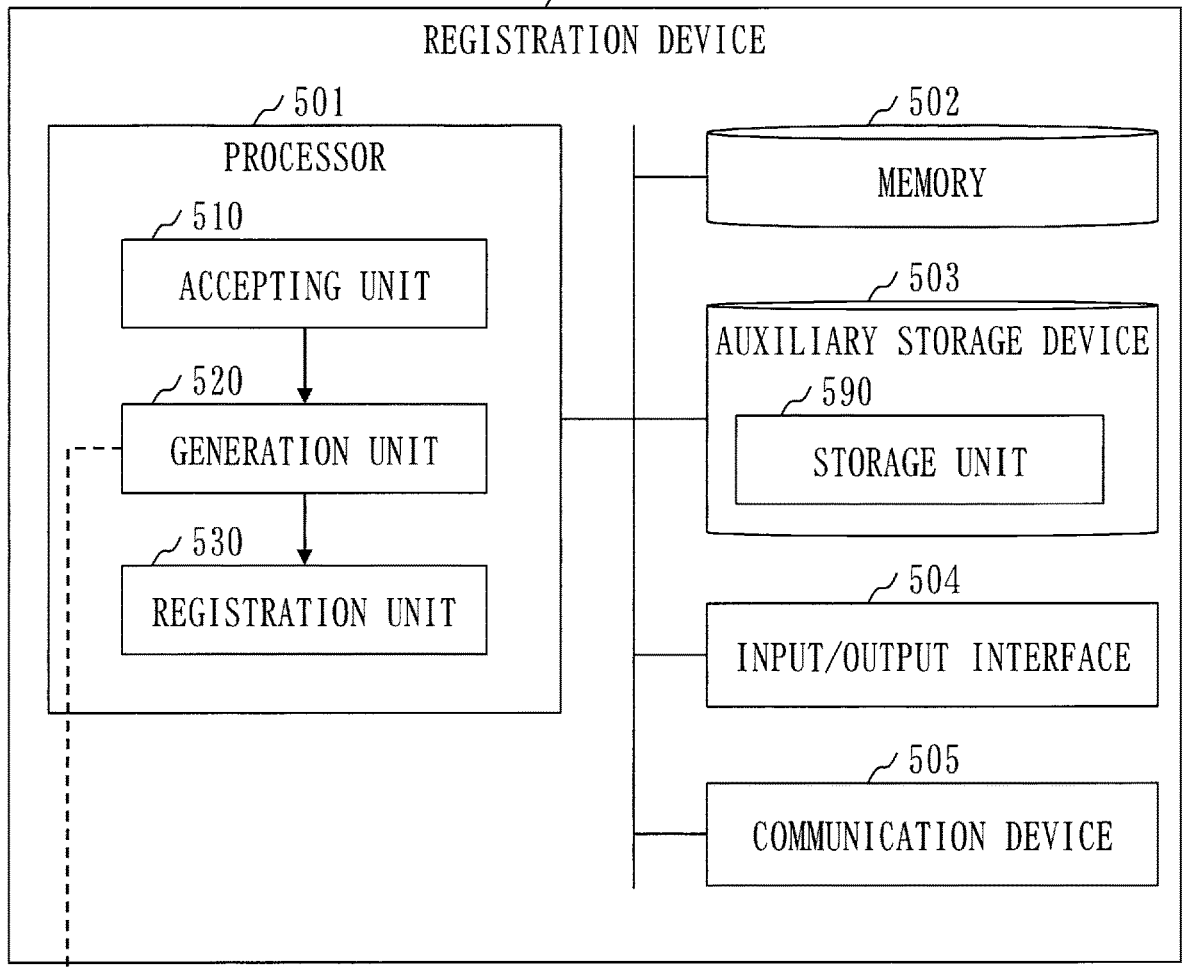
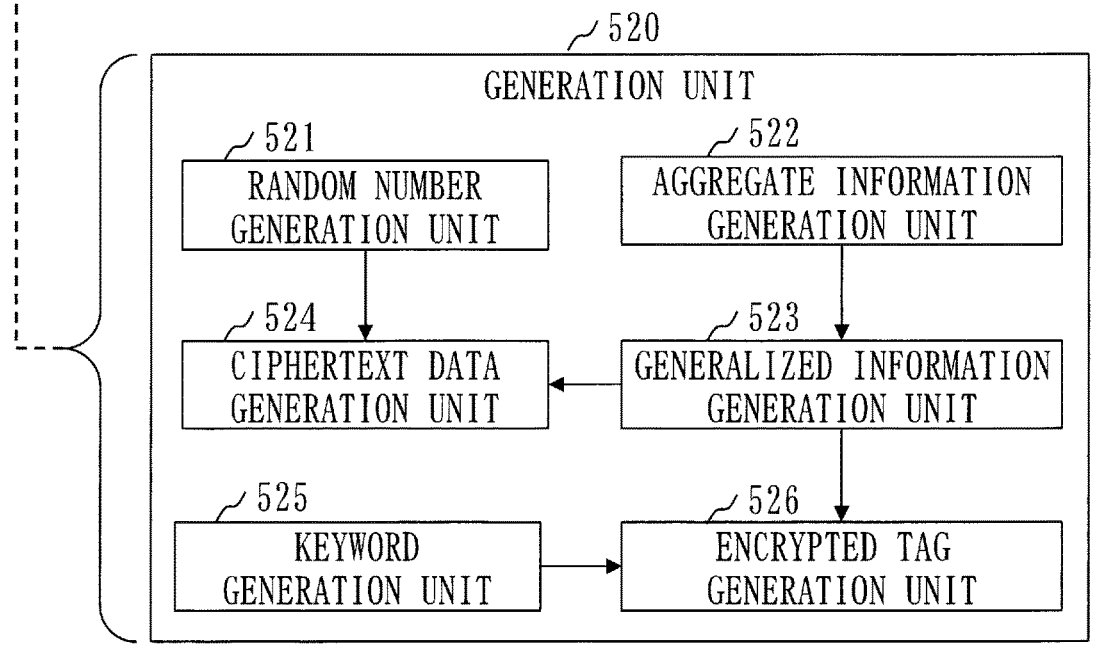

Fig. 12

| NUMBER | ATTRIBUTE INFORMATION | | | |
|---|---|---|---|---|
| | FIRST ATTRIBUTE (DIVISION) | SECOND ATTRIBUTE (DEPARTMENT) | THIRD ATTRIBUTE (SECTION) | FOURTH ATTRIBUTE (NAME) |
| 1 | Di | De | Sc | Ne |
| 2 | Di | De | Sd | Nf |
| 3 | Di | De | Sc | * |
| 4 | Di | De | * | * |
| ⋮ | ⋮ | ⋮ | ⋮ | ⋮ |

Fig. 13

| NUMBER | AGGREGATE INFORMATION | |
|---|---|---|
| | FIRST ATTRIBUTE \| SECOND ATTRIBUTE (DIVISION\|DEPARTMENT) | THIRD ATTRIBUTE \| FOURTH ATTRIBUTE (SECTION\|NAME) |
| 1 | Di \| De | Sc \| Ne |
| 2 | Di \| De | Sd \| Nf |
| 3 | Di \| De | Sc \| * |
| 4 | Di \| De | * \| * |
| ⋮ | ⋮ | ⋮ |

Fig. 15

791:REGISTRATION DATABASE

| FILE NAME | CIPHERTEXT DATA | ENCRYPTED TAG |
|---|---|---|
| File($M_1$) | $C_1$ | CT_{TOKYO} |
| File($M_2$) | $C_2$ | CT_{OSAKA} |
| File($M_3$) | $C_3$ | CT_{AICHI} |
| ⋮ | ⋮ | ⋮ |

REGISTRATION DEVICE, SEARCH OPERATION DEVICE, AND DATA MANAGEMENT DEVICE

CROSS REFERENCE TO RELATED APPLICATIONS

This application is a Continuation of PCT International Application No. PCT/JP2020/000894, filed on Jan. 14, 2020, which is hereby expressly incorporated by reference into the present application.

TECHNICAL FIELD

The present disclosure relates to secret search techniques.

BACKGROUND ART

The secret search is a technique of searching for encrypted data as encrypted.

That is, the secret search is a technique of searching for encrypted data without decoding.

In recent years, the secret search attracts attention in cloud services as a security technique for protecting classified information from wiretapping by a server administrator.

That is, the secret search attracts attention as a security technique for managing data on the Internet.

As secret search schemes, there are two types: a common key scheme and a public key scheme.

In the common key scheme, common key cryptography is used, and registerers and searchers are limited.

In the public key scheme, public key cryptography is used, and searchers are limited but registerers are not limited.

Patent Literature 1 discloses a multiuser-type common key scheme.

In the multiuser-type common key scheme, a registerer encrypts data by using a secret key of each searcher. To encrypted data to be registered, an encrypted tag is added. In the encrypted tag, a keyword and search authority can be embedded.

For example, authority to allow only a searcher A to conduct a search is embedded in the encrypted tag. Also, a searcher B generates a search query by using its own secret key and a search keyword. In this case, since the searcher B has no search authority, even if the search keyword in the search query of the searcher B is the same as the keyword in the encrypted tag, encrypted data cannot be obtained as a search result.

CITATION LIST

Patent Literature

Patent Literature 1: WO 2019/142651

SUMMARY OF INVENTION

Technical Problem

In the multiuser-type common key scheme, there is a problem of vulnerability against coalition attacks by a plurality of authorized users.

For example, if an authorized user X and an authorized user Y form a coalition, both of a secret key SK_X of the authorized user X and a secret key SK_Y of the authorized user Y can be used. In that case, it is possible to generate a secret key which allows the authorized user X or the authorized user Y to search for encrypted data that is supposed not to be searchable singly by either the authorized user X or the authorized user Y. Specifically, with a section manager of a general affairs section and a representative in a personnel section forming a coalition, there is a possibility that a secret key of the section manager of the personnel section is generated.

An object of the present disclosure is to allow an improvement in safety of the multiuser-type common key scheme.

Solution to Problem

A registration device according to the present disclosure includes:
  an accepting unit to accept plaintext, attribute information indicating a plurality of attribute values which identify a plurality of attributes of a user having an authority of referring to the plaintext, and a registration key identical to a key for use in generating a user key for generating a search query;
  an aggregate information generation unit to generate aggregate information indicating one or more aggregate values each configured of one or more attribute values, by aggregating the plurality of attribute values included in the attribute information;
  a generalized information generation unit to generate, for each of the aggregate values included in the aggregate information, a plurality of generalized values each configured of zero or more wildcards which replace zero or more attribute values in the aggregate value and remaining attribute values in the aggregate value and to generate generalized information indicating the plurality of generalized values for each of the aggregate values included in the aggregate information;
  a ciphertext data generation unit to generate ciphertext data including the plaintext encrypted, by using the plaintext, the attribute information, the generalized information, and the registration key.
  an encrypted tag generation unit to generate, by using a keyword regarding the plaintext, the attribute information, the generalized information, and the registration key, an encrypted tag including the keyword encrypted; and
  a registration unit to register a set of the ciphertext data and the encrypted tag in a database.

Advantageous Effects of Invention

According to the present disclosure, the plurality of attribute values of a user having an authority of referring to plaintext are aggregated, and ciphertext data and an encrypted tag are generated based on one or more aggregate values.

With this, resistance against coalition attacks by a plurality of authorized users can be improved. That is, safety of the multiuser-type common key scheme can be improved.

BRIEF DESCRIPTION OF DRAWINGS

FIG. 5 is a structural diagram of a registration device 500 in Embodiment 1.

FIG. 12 is a diagram illustrating one example of attribute information in Embodiment 1.

FIG. 13 is a diagram illustrating one example of aggregate information in Embodiment 1.

FIG. 15 is a diagram illustrating a registration database 791 in Embodiment 1.

DESCRIPTION OF EMBODIMENTS

Figure 1:
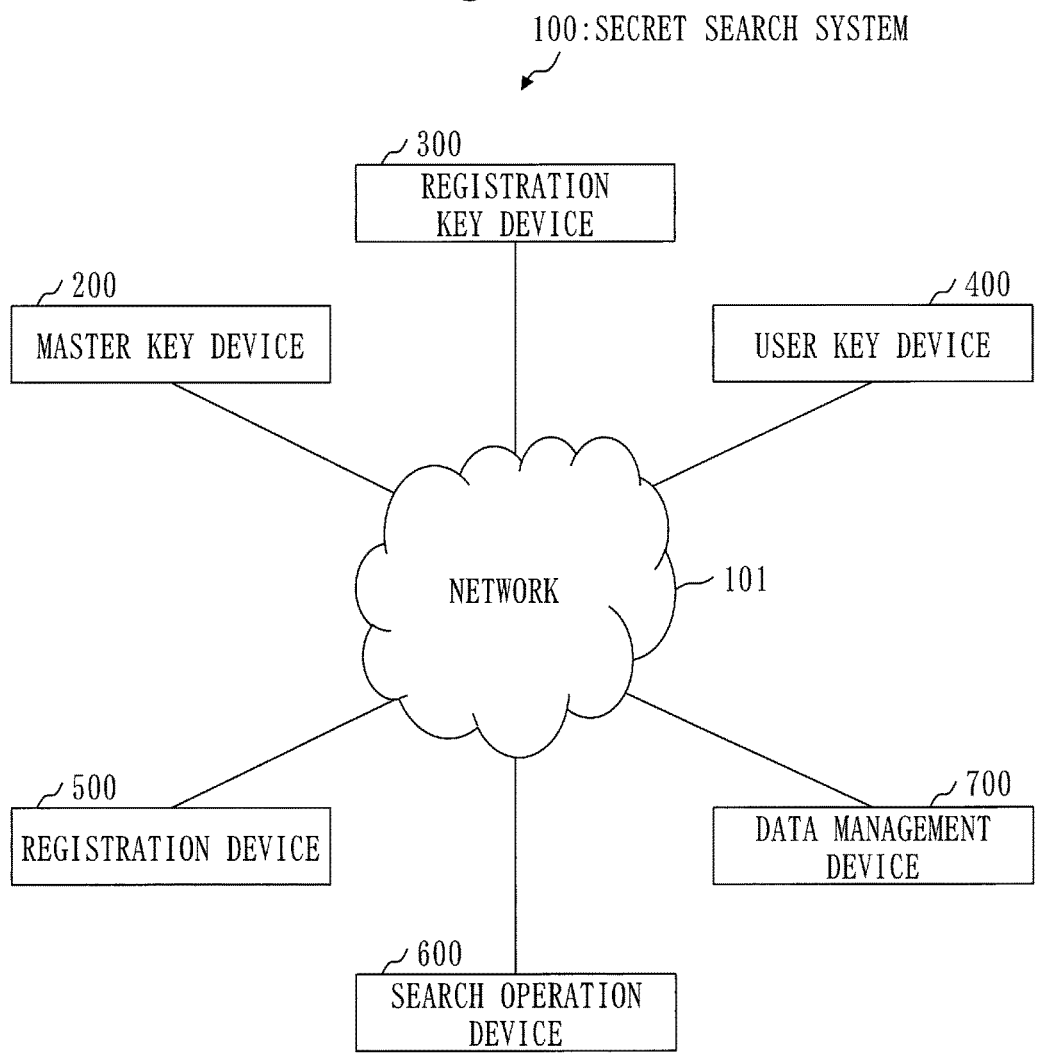
FIG. 1 is a structural diagram of a secret search system 100 in Embodiment 1.

In an embodiment and drawings, the same components or corresponding components are provided with the same reference character. Description of components provided with the same reference character as that of a described component is omitted or simplified as appropriate. An arrow in a drawing mainly illustrates a flow of data or flow of process.

Embodiment 1

A mode of conducting a secret search with a multiuser-type common key scheme is described based on FIG. 1 to FIG. 26.

*Description of Structure*

Based on FIG. 1, the structure of a secret search system 100 is described.

The secret search system 100 includes a master key device 200, a registration key device 300, a user key device 400, a registration device 500, a search operation device 600, and a data management device 700.

The devices of the secret search system 100 each mutually perform communication via a network 101.

Figure 2:
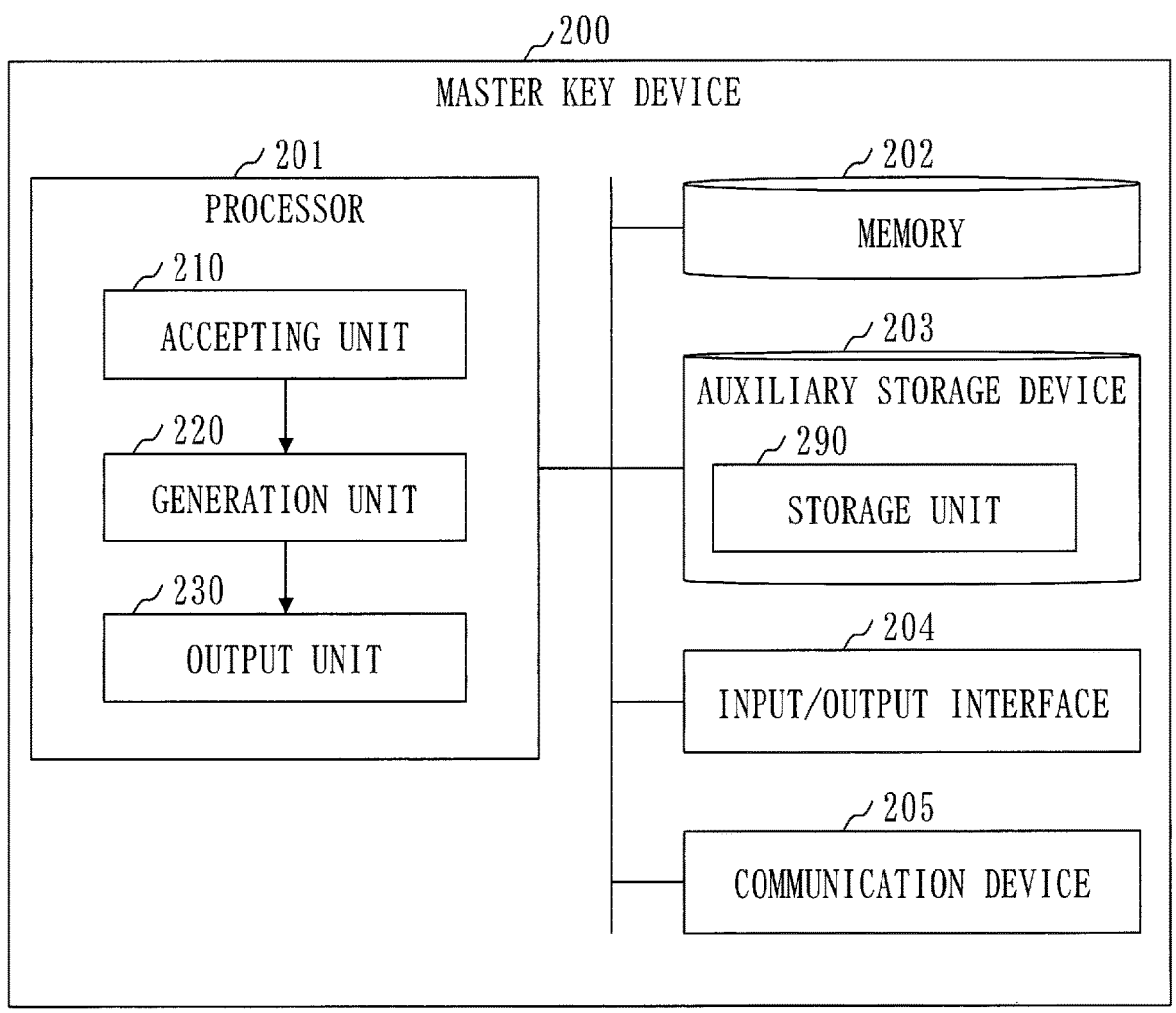
FIG. 2 is a structural diagram of a master key device 200 in Embodiment 1.

Based on FIG. 2, the structure of the master key device 200 is described.

The master key device 200 is a computer including hardware such as a processor 201, a memory 202, an auxiliary storage device 203, an input/output interface 204, and a communication device 205. These pieces of hardware are mutually connected via signal lines.

The processor 201 is an IC which performs an arithmetic process, and controls the other hardware. For example, the processor 201 is a CPU, DSP, or GPU.

IC is an abbreviation for Integrated Circuit.

CPU is an abbreviation for Central Processing Unit.

DSP is an abbreviation for Digital Signal Processor.

GPU is an abbreviation for Graphics Processing Unit.

The memory 202 is a volatile or non-volatile storage device. The memory 202 is also referred to as a main storage device or main memory. For example, the memory 202 is a RAM. Data stored in the memory 202 is stored in the auxiliary storage device 203 as required.

RAM is an abbreviation for Random Access Memory.

The auxiliary storage device 203 is a non-volatile storage device. For example, the auxiliary storage device 203 is a ROM, HDD, or flash memory. Data stored in the auxiliary storage device 203 is loaded into the memory 202 as required.

ROM is an abbreviation for Read Only Memory.

HDD is an abbreviation for Hard Disk Drive.

The input/output interface 204 is a port to which an input device and an output device are connected. For example, the input/output interface 204 is a USB terminal, the input device is a keyboard and a mouse, and the output device is a display.

USB is an abbreviation for Universal Serial Bus.

The communication device 205 is a receiver and a transmitter. For example, the communication device 205 is a communication chip or NIC.

NIC is an abbreviation for Network Interface Card.

The master key device 200 includes components such as an accepting unit 210, a generation unit 220, and an output unit 230. These components are implemented by software.

The auxiliary storage device 203 has stored therein a master key program for causing a computer to function as the accepting unit 210, the generation unit 220, and the output unit 230. The master key program is loaded into the memory 202 and executed by the processor 201.

The auxiliary storage device 203 further has an OS stored therein. At least part of the OS is loaded into the memory 202 and executed by the processor 201.

The processor 201 executes the master key program while executing the OS.

OS is an abbreviation for Operating System.

Input/output data of the master key program is stored in a storage unit 290.

The auxiliary storage device 203 functions as the storage unit 290. However, a storage device such as the memory 202, a register in the processor 201, or a cache memory in the processor 201 may function as the storage unit 290 in place of the auxiliary storage device 203 or together with the auxiliary storage device 203.

The master key device 200 may include a plurality of processors which replace the processor 201. The plurality of processors share the function of the processor 201.

The master key program can be recorded (stored) in a non-volatile recording medium such as an optical disk or flash memory so as to be readably by a computer.

Figure 3:
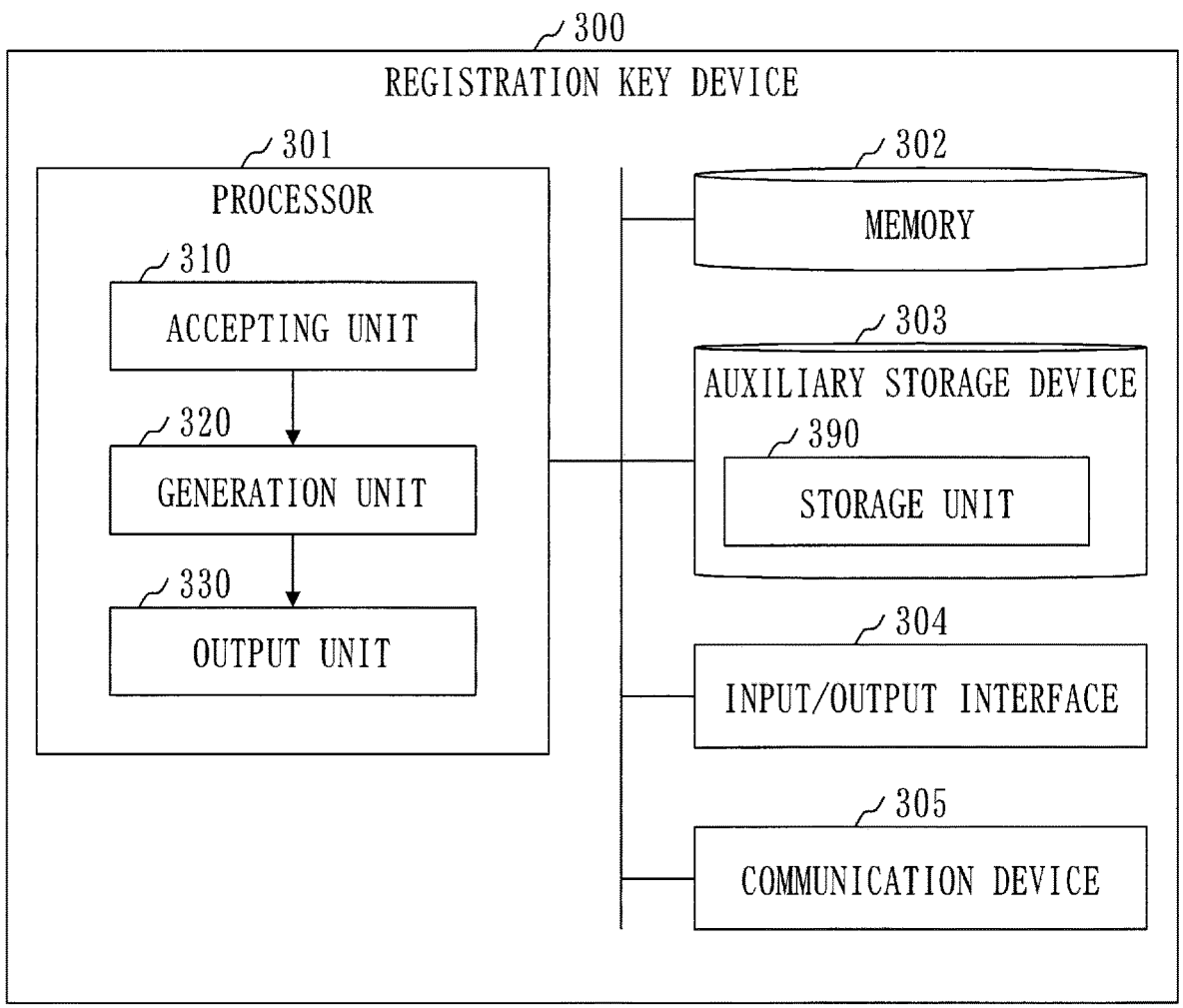
FIG. 3 is a structural diagram of a registration key device 300 in Embodiment 1.

Based on FIG. 3, the structure of the registration key device 300 is described.

The registration key device 300 is a computer including hardware such as a processor 301, a memory 302, an auxiliary storage device 303, an input/output interface 304, and a communication device 305. These pieces of hardware are mutually connected via signal lines.

The processor 301 is an IC which performs an arithmetic process, and controls the other hardware. For example, the processor 301 is a CPU, DSP, or GPU.

The memory 302 is a volatile or non-volatile storage device. The memory 302 is also referred to as a main storage device or main memory. For example, the memory 302 is a RAM. Data stored in the memory 302 is stored in the auxiliary storage device 303 as required.

The auxiliary storage device 303 is a non-volatile storage device. For example, the auxiliary storage device 303 is a ROM, HDD, or flash memory. Data stored in the auxiliary storage device 303 is loaded into the memory 302 as required.

The input/output interface 304 is a port to which an input device and an output device are connected. For example, the input/output interface 304 is a USB terminal, the input device is a keyboard and a mouse, and the output device is a display.

The communication device 305 is a receiver and a transmitter. For example, the communication device 305 is a communication chip or NIC.

The registration key device 300 includes components such as an accepting unit 310, a generation unit 320, and an output unit 330. These components are implemented by software.

The auxiliary storage device 303 has stored therein a registration key program for causing a computer to function as the accepting unit 310, the generation unit 320, and the output unit 330. The registration key program is loaded into the memory 302 and executed by the processor 301.

The auxiliary storage device 303 further has an OS stored therein. At least part of the OS is loaded into the memory 302 and executed by the processor 301.

The processor 301 executes the registration key program while executing the OS.

Input/output data of the registration key program is stored in a storage unit 390.

The auxiliary storage device 303 functions as the storage unit 390. However, a storage device such as the memory 302, a register in the processor 301, or a cache memory in the processor 301 may function as the storage unit 390 in place of the auxiliary storage device 303 or together with the auxiliary storage device 303.

The registration key device 300 may include a plurality of processors which replace the processor 301. The plurality of processors share the function of the processor 301.

The registration key program can be recorded (stored) in a non-volatile recording medium such as an optical disk or flash memory so as to be readably by a computer.

Figure 4:
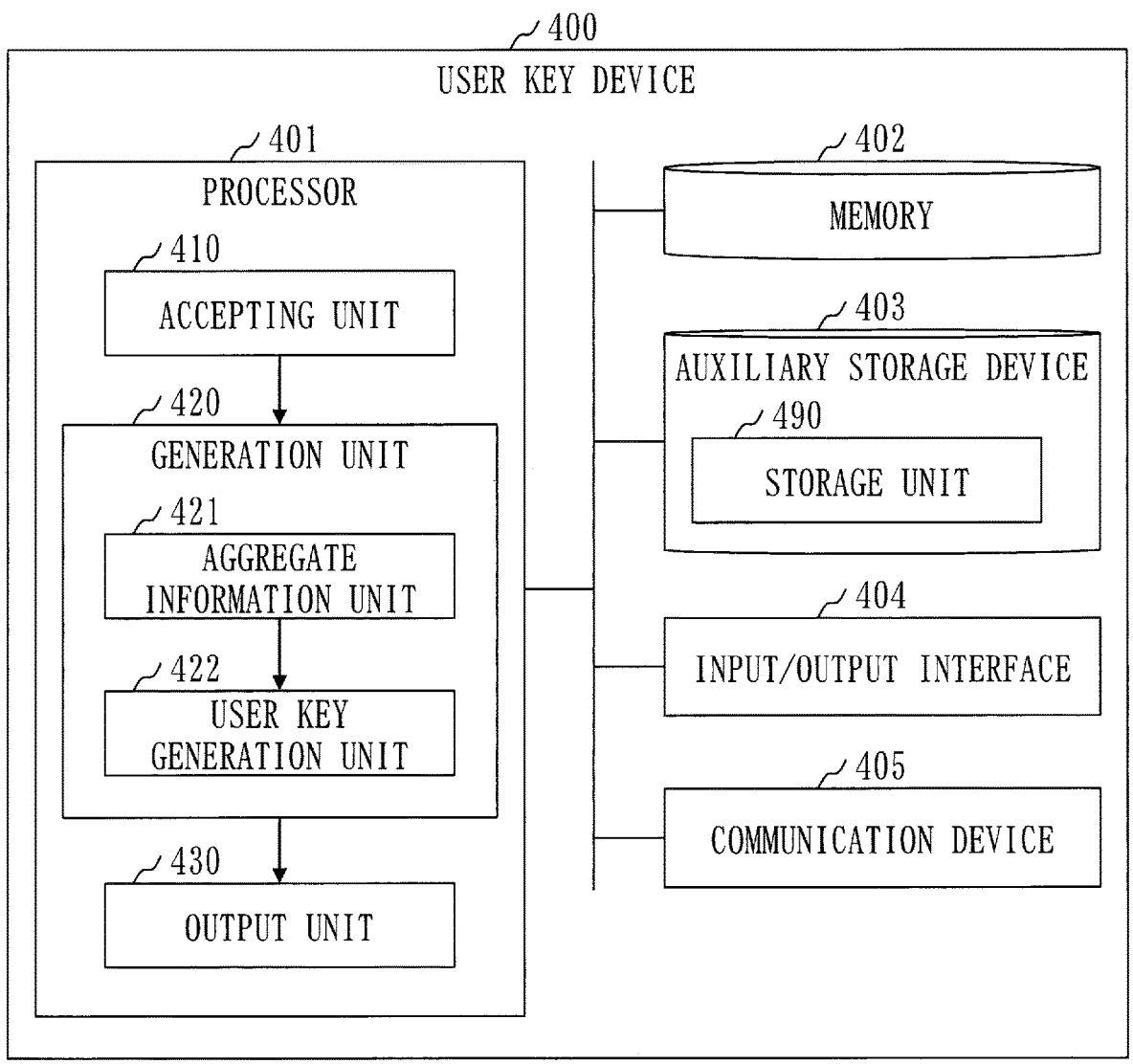
FIG. 4 is a structural diagram of a user key device 400 in Embodiment 1.

Based on FIG. 4, the structure of the user key device 400 is described.

The user key device 400 is a computer including hardware such as a processor 401, a memory 402, an auxiliary storage device 403, an input/output interface 404, and a communication device 405. These pieces of hardware are mutually connected via signal lines.

The processor 401 is an IC which performs an arithmetic process, and controls the other hardware. For example, the processor 401 is a CPU, DSP, or GPU.

The memory 402 is a volatile or non-volatile storage device. The memory 402 is also referred to as a main storage device or main memory. For example, the memory 402 is a RAM. Data stored in the memory 402 is stored in the auxiliary storage device 403 as required.

The auxiliary storage device 403 is a non-volatile storage device. For example, the auxiliary storage device 403 is a ROM, HDD, or flash memory. Data stored in the auxiliary storage device 403 is loaded into the memory 402 as required.

The input/output interface 404 is a port to which an input device and an output device are connected. For example, the input/output interface 404 is a USB terminal, the input device is a keyboard and a mouse, and the output device is a display.

The communication device 405 is a receiver and a transmitter. For example, the communication device 405 is a communication chip or NIC.

The user key device 400 includes components such as an accepting unit 410, a generation unit 420, and an output unit 430.

The generation unit 420 includes components such as an aggregate information generation unit 421 and a user key generation unit 422.

These components are implemented by software.

The auxiliary storage device 403 has stored therein a user key program for causing a computer to function as the accepting unit 410, the generation unit 420, and the output unit 430. The user key program is loaded into the memory 402 and executed by the processor 401.

The auxiliary storage device 403 further has an OS stored therein. At least part of the OS is loaded into the memory 402 and executed by the processor 401.

The processor 401 executes the user key program while executing the OS.

Input/output data of the user key program is stored in a storage unit 490.

The auxiliary storage device 403 functions as the storage unit 490. However, a storage device such as the memory 402, a register in the processor 401, or a cache memory in the processor 401 may function as the storage unit 490 in place of the auxiliary storage device 403 or together with the auxiliary storage device 403.

The user key device 400 may include a plurality of processors which replace the processor 401. The plurality of processors share the function of the processor 401.

The user key program can be recorded (stored) in a non-volatile recording medium such as an optical disk or flash memory so as to be readably by a computer.

Based on FIG. 5, the structure of the registration device 500 is described.

The registration device 500 is a computer including hardware such as a processor 501, a memory 502, an auxiliary storage device 503, an input/output interface 504, and a communication device 505. These pieces of hardware are mutually connected via signal lines.

The processor 501 is an IC which performs an arithmetic process, and controls the other hardware. For example, the processor 501 is a CPU, DSP, or GPU.

The memory 502 is a volatile or non-volatile storage device. The memory 502 is also referred to as a main storage device or main memory. For example, the memory 502 is a RAM. Data stored in the memory 502 is stored in the auxiliary storage device 503 as required.

The auxiliary storage device 503 is anon-volatile storage device. For example, the auxiliary storage device 503 is a ROM, HDD, or flash memory. Data stored in the auxiliary storage device 503 is loaded into the memory 502 as required.

The input/output interface 504 is a port to which an input device and an output device are connected. For example, the input/output interface 504 is a USB terminal, the input device is a keyboard and a mouse, and the output device is a display.

The communication device 505 is a receiver and a transmitter. For example, the communication device 505 is a communication chip or NIC.

The registration device 500 includes components such as an accepting unit 510, a generation unit 520, and a registration unit 530.

The generation unit 520 includes components such as a random number generation unit 521, an aggregate information generation unit 522, a generalized information generation unit 523, a ciphertext data generation unit 524, a keyword generation unit 525, and an encrypted tag generation unit 526.

These components are implemented by software.

The auxiliary storage device 503 has stored therein a registration program for causing a computer to function as the accepting unit 510, the generation unit 520, and the registration unit 530. The registration program is loaded into the memory 502 and executed by the processor 501.

The auxiliary storage device 503 further has an OS stored therein. At least part of the OS is loaded into the memory 502 and executed by the processor 501.

The processor 501 executes the registration program while executing the OS.

Input/output data of the registration program is stored in a storage unit 590.

The auxiliary storage device 503 functions as the storage unit 590. However, a storage device such as the memory 502, a register in the processor 501, or a cache memory in the processor 501 may function as the storage unit 590 in place of the auxiliary storage device 503 or together with the auxiliary storage device 503.

The registration device 500 may include a plurality of processors which replace the processor 501. The plurality of processors share the function of the processor 501.

The registration program can be recorded (stored) in a non-volatile recording medium such as an optical disk or flash memory so as to be readably by a computer.

Figure 6:
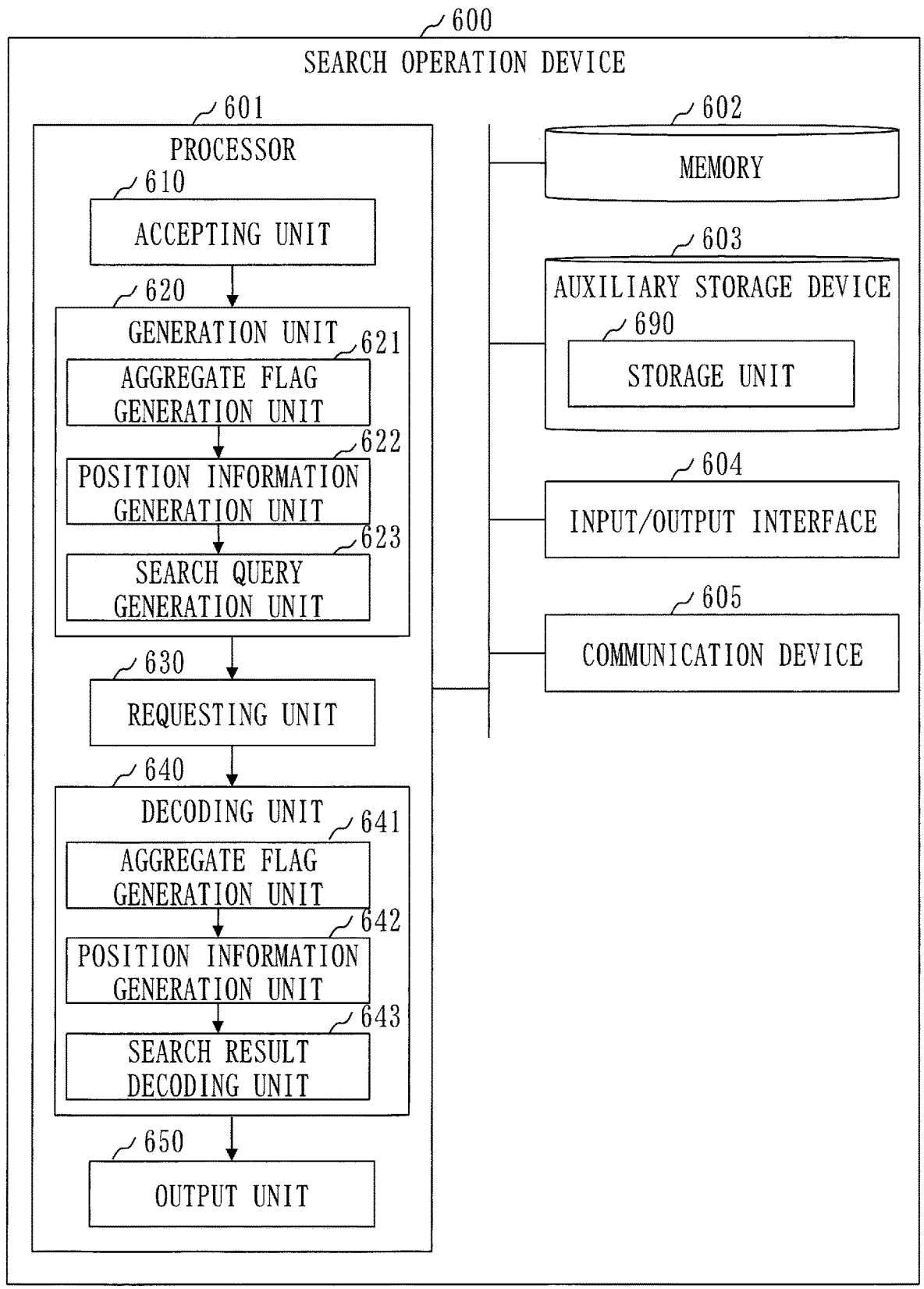
FIG. 6 is a structural diagram of a search operation device 600 in Embodiment 1.

Based on FIG. 6, the structure of the search operation device 600 is described.

The search operation device 600 is a computer including hardware such as a processor 601, a memory 602, an auxiliary storage device 603, an input/output interface 604, and a communication device 605. These pieces of hardware are mutually connected via signal lines.

The processor 601 is an IC which performs an arithmetic process, and controls the other hardware. For example, the processor 601 is a CPU, DSP, or GPU.

The memory 602 is a volatile or non-volatile storage device. The memory 602 is also referred to as a main storage device or main memory. For example, the memory 602 is a RAM. Data stored in the memory 602 is stored in the auxiliary storage device 603 as required.

The auxiliary storage device 603 is a non-volatile storage device. For example, the auxiliary storage device 603 is a ROM, HDD, or flash memory. Data stored in the auxiliary storage device 603 is loaded into the memory 602 as required.

The input/output interface 604 is a port to which an input device and an output device are connected. For example, the input/output interface 604 is a USB terminal, the input device is a keyboard and a mouse, and the output device is a display.

The communication device 605 is a receiver and a transmitter. For example, the communication device 605 is a communication chip or NIC.

The search operation device 600 includes components such as an accepting unit 610, a generation unit 620, a requesting unit 630, a decoding unit 640, and an output unit 650.

The generation unit 620 includes components such as an aggregate flag generation unit 621, a position information generation unit 622, and a search query generation unit 623.

The decoding unit 640 includes components such as an aggregate flag generation unit 641, a position information generation unit 642, and a search result decoding unit 643.

These components are implemented by software.

The auxiliary storage device 603 has stored therein a search operation program for causing a computer to function as the accepting unit 610, the generation unit 620, the requesting unit 630, the decoding unit 640, and the output unit 650. The search operation program is loaded into the memory 602 and executed by the processor 601.

The auxiliary storage device 603 further has an OS stored therein. At least part of the OS is loaded into the memory 602 and executed by the processor 601.

The processor 601 executes the search operation program while executing the OS.

Input/output data of the search operation program is stored in a storage unit 690.

The auxiliary storage device 603 functions as the storage unit 690. However, a storage device such as the memory 602, a register in the processor 601, or a cache memory in the processor 601 may function as the storage unit 690 in place of the auxiliary storage device 603 or together with the auxiliary storage device 603.

The search operation device 600 may include a plurality of processors which replace the processor 601. The plurality of processors share the function of the processor 601.

The search operation program can be recorded (stored) in a non-volatile recording medium such as an optical disk or flash memory so as to be readably by a computer.

Figure 7:
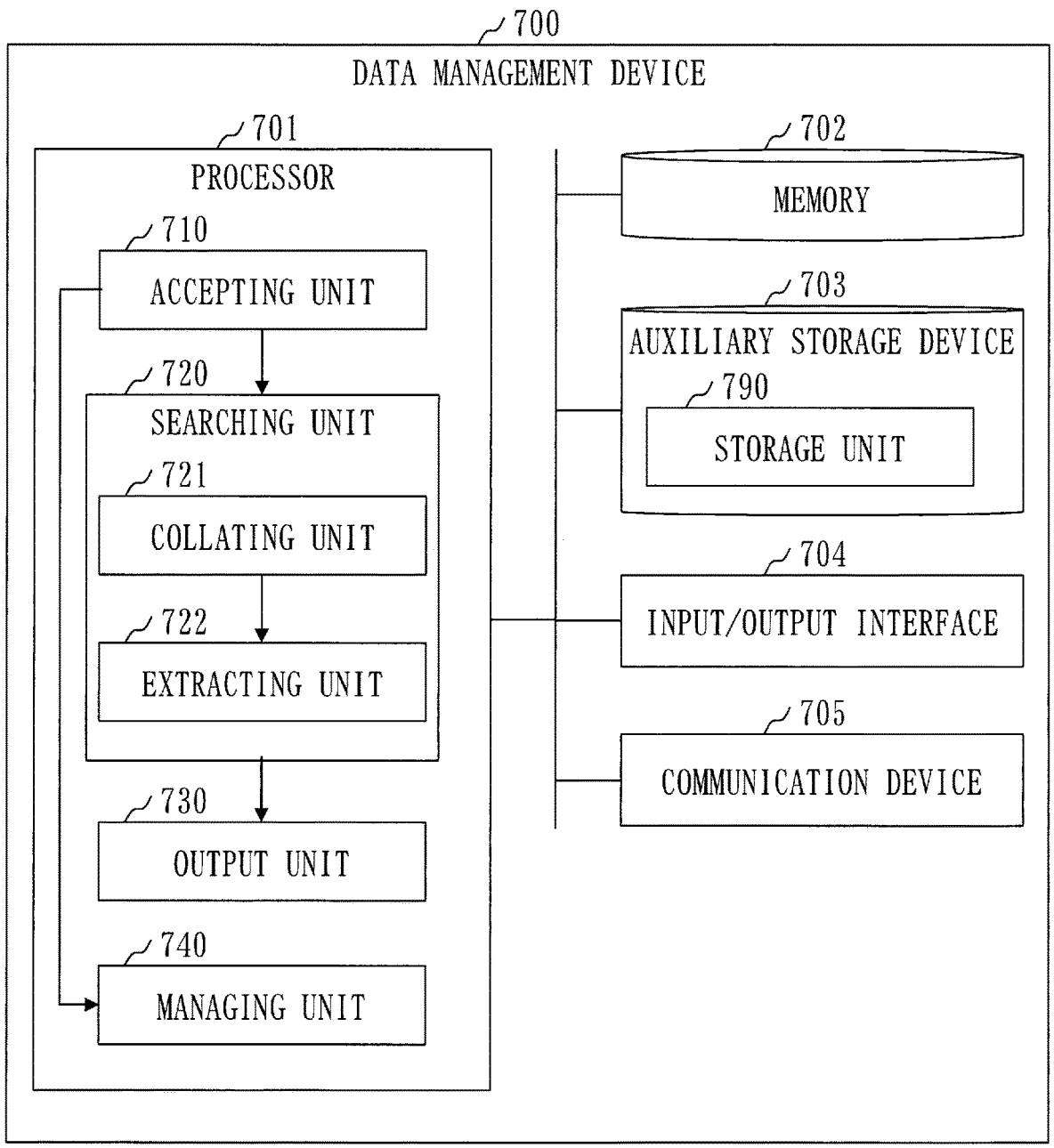
FIG. 7 is a structural diagram of a data management device 700 in Embodiment 1.

Based on FIG. 7, the structure of the data management device 700 is described.

The data management device 700 is a computer including hardware such as a processor 701, a memory 702, an auxiliary storage device 703, an input/output interface 704, and a communication device 705. These pieces of hardware are mutually connected via signal lines.

The processor 701 is an IC which performs an arithmetic process, and controls the other hardware. For example, the processor 701 is a CPU, DSP, or GPU.

The memory 702 is a volatile or non-volatile storage device. The memory 702 is also referred to as a main storage device or main memory. For example, the memory 702 is a RAM. Data stored in the memory 702 is stored in the auxiliary storage device 703 as required.

The auxiliary storage device 703 is a non-volatile storage device. For example, the auxiliary storage device 703 is a ROM. HDD, or flash memory. Data stored in the auxiliary storage device 703 is loaded into the memory 702 as required.

The input/output interface 704 is a port to which an input device and an output device are connected. For example, the input/output interface 704 is a USB terminal, the input device is a keyboard and a mouse, and the output device is a display.

The communication device 705 is a receiver and a transmitter. For example, the communication device 705 is a communication chip or NIC.

The data management device 700 includes components such as an accepting unit 710, a searching unit 720, an output unit 730, and a managing unit 740.

The searching unit 720 includes components such as a collating unit 721 and an extracting unit 722.

These components are implemented by software.

The auxiliary storage device 703 has stored therein a data management program for causing a computer to function as the accepting unit 710, the searching unit 720, the output unit 730, and the managing unit 740. The data management program is loaded into the memory 702 and executed by the processor 701.

The auxiliary storage device 703 further has an OS stored therein. At least part of the OS is loaded into the memory 702 and executed by the processor 701.

The processor 701 executes the data management program while executing the OS.

Input/output data of the data management program is stored in a storage unit 790.

The auxiliary storage device 703 functions as the storage unit 790. However, a storage device such as the memory 702, a register in the processor 701, or a cache memory in the processor 701 may function as the storage unit 790 in place of the auxiliary storage device 703 or together with the auxiliary storage device 703.

The data management device 700 may include a plurality of processors which replace the processor 701. The plurality of processors share the function of the processor 701.

The data management program can be recorded (stored) in a non-volatile recording medium such as an optical disk or flash memory so as to be readably by a computer.

\*\*\*Description of Operation\*\*\*

The procedure of the operation of the secret search system 100 corresponds to a secret search method.

Figure 8:
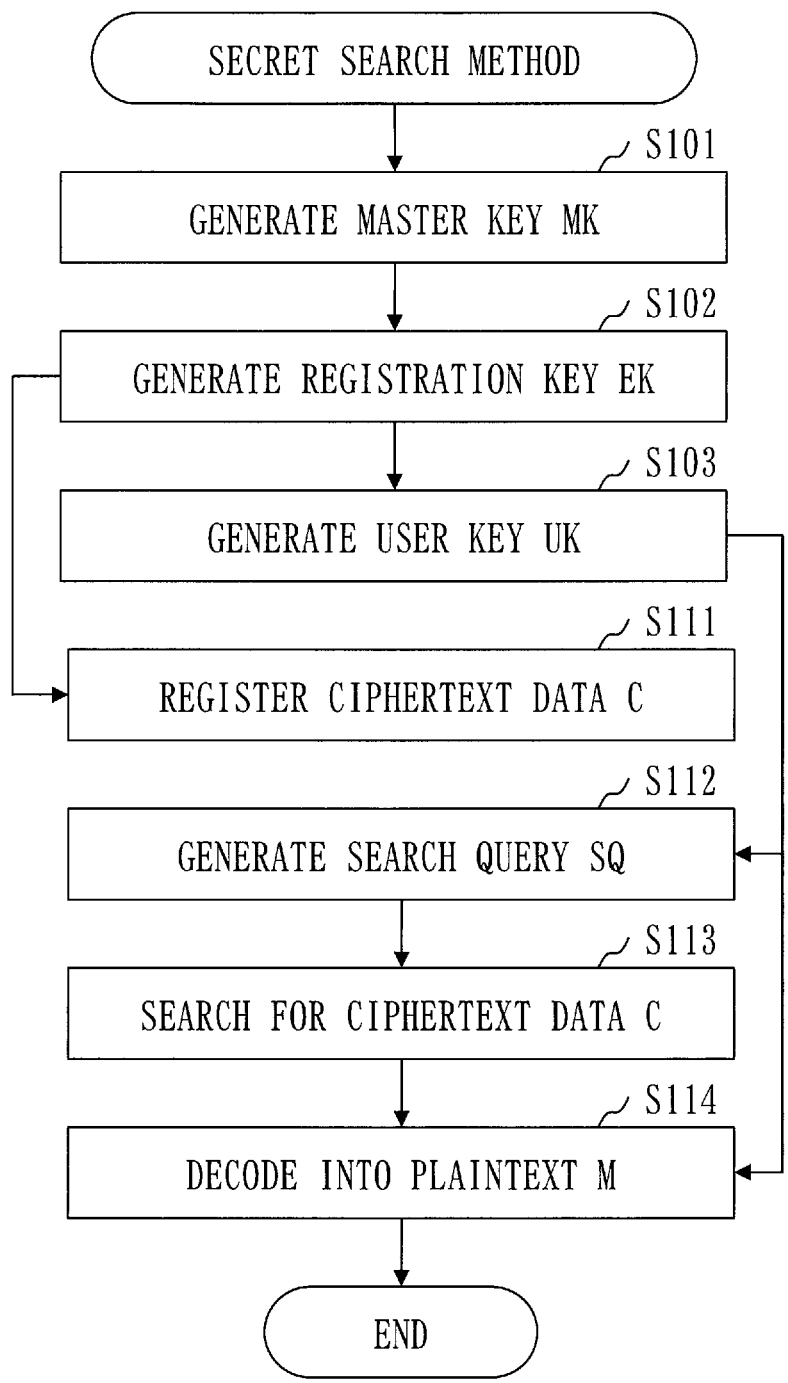
FIG. 8 is a flowchart illustrating a secret search method in Embodiment 1.

Based on FIG. 8, a general outline of the secret search method is described.

At step S101, the master key device 200 generates a master key MK.

At step S102, the registration key device 300 generates a registration key EK by using the master key MK.

At step S103, the user key device 400 generates a user key UK by using the registration key EK.

At step S111, the registration device 500 generates a set of ciphertext data C and an encrypted tag CT by using the registration key EK, and registers the generated set in a database.

The ciphertext data C is generated by encrypting a plaintext M.

The encrypted tag CT is generated by encrypting a keyword for searching for the ciphertext data C. The keyword is not leaked from the encrypted tag CT.

In the database, a plurality of sets of the ciphertext data C and the encrypted tag CT are registered.

At step S112, the search operation device 600 generates a search query SQ by using the user key UK.

The search query SQ is generated by randomizing a specified keyword by using the user key UK.

At step S113, the search operation device 600 requests a search by transmitting the search query SQ to the data management device 700.

The data management device 700 receives the search query SQ, and searches for the encrypted tag CT matching the search query SQ by a special arithmetic operation.

In the special arithmetic operation, each encrypted tag CT is not decoded, and the keyword of the search query SQ is compared with the keyword of each encrypted tag CT.

At step S114, the data management device 700 responds with the search result by transmitting the ciphertext data C corresponding to the encrypted tag CT matching the search query SQ to the search operation device 600.

The search operation device 600 receives the ciphertext data C, and decodes the ciphertext data C into the plaintext M by using the user key UK.

Figure 9:
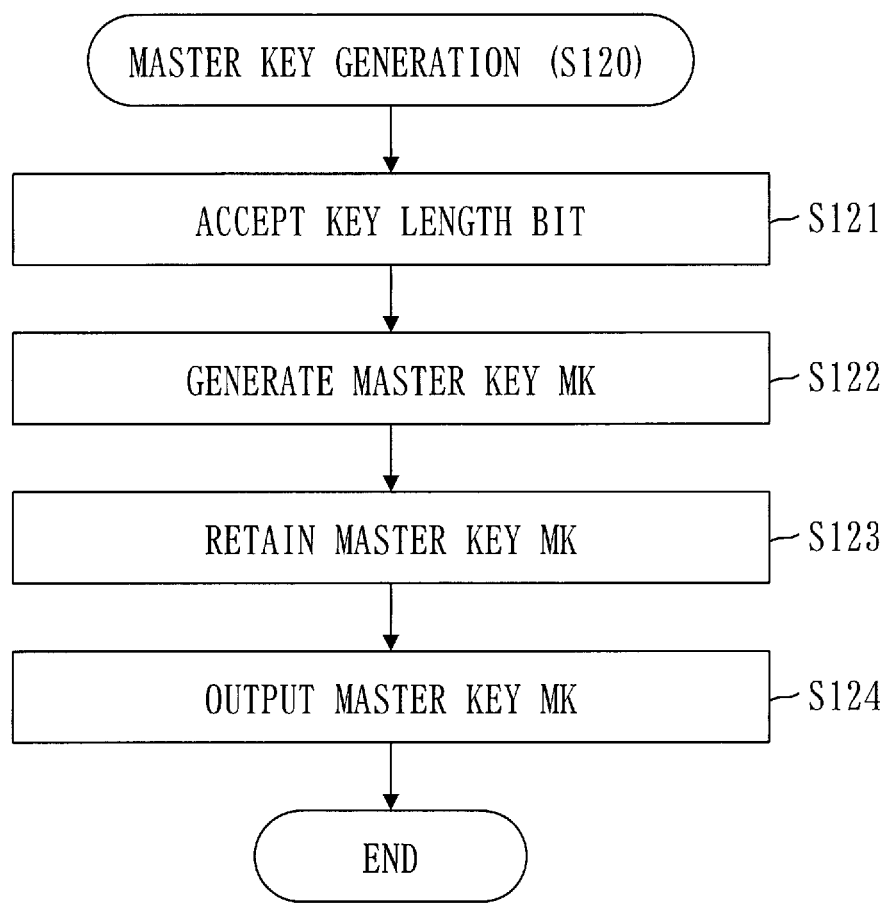
FIG. 9 is a flowchart of master key generation (S120) in Embodiment 1.

Based on FIG. 9, master key generation (S120) is described.

Master key generation (S120) is a process to be performed by the master key device 200.

At step S121, the accepting unit 210 accepts a key length BIT.

For example, the accepting unit 210 accepts the key length BIT inputted to the master key device 200 via the input/output interface 204. The accepting unit 210 may accept the key length BIT from an application program executed in the master key device 200.

The key length BIT is a bit length of the master key MK.

At step S122, the generation unit 220 generates the master key MK.

Specifically, the generation unit 220 generates a random bit string having the same length as the key length BIT. The generated bit string is the master key MK.

For example, when the key length BIT is 256 bits, the generation unit 220 generates a random bit string of 256 bits. With this, the master key MK of 256 bits can be obtained.

At step S123, the generation unit 220 stores the master key MK in the storage unit 290. With this, the master key MK is retained in the storage unit 290.

At step S124, the output unit 230 outputs the master key MK.

For example, the output unit 230 transmits the master key MK to the registration key device 300 by using the communication device 205.

Figure 10:
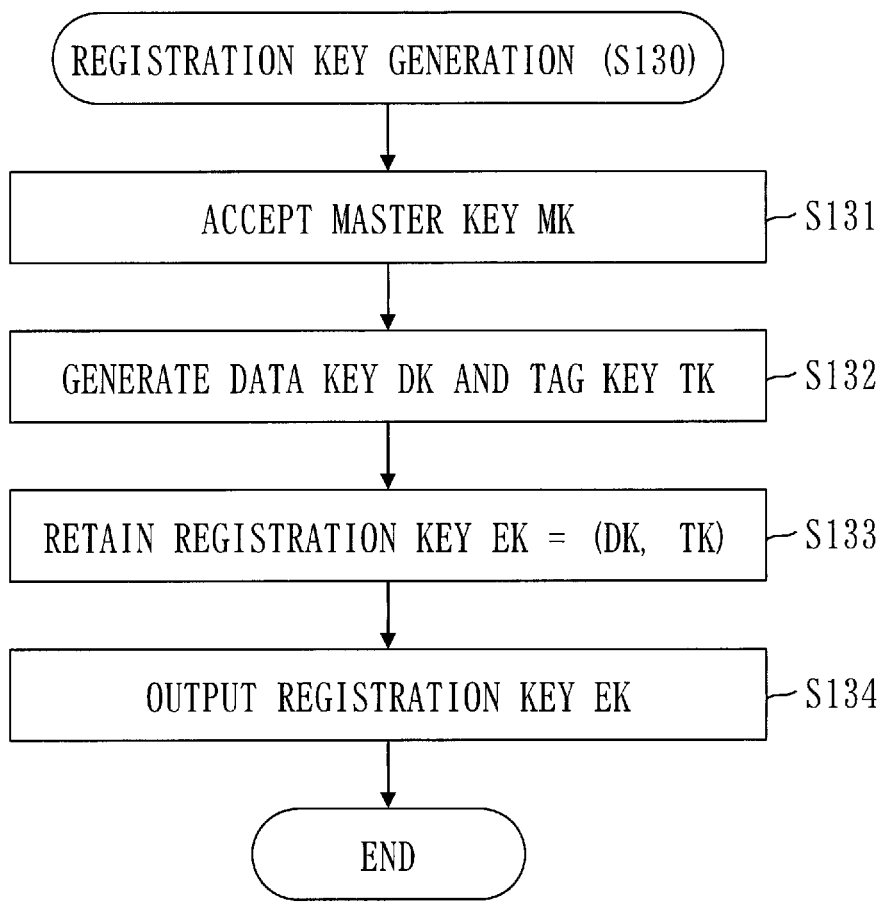
FIG. 10 is a flowchart of registration key generation (S130) in Embodiment 1.

Based on FIG. 10, registration key generation (S130) is described.

Registration key generation (S130) is a process to be performed by the registration key device 300.

At step S131, the accepting unit 310 accepts the master key MK.

For example, the accepting unit 310 receives the master key MK from the master key device 200 by using the communication device 305. The accepting unit 310 may accept the master key MK inputted to the registration key device 300 via the input/output interface 304.

At step S132, the generation unit 320 generates a data key DK and a tag key TK by using the master key MK.

Specifically, the generation unit 320 generates two random numbers by executing a function F_1 by taking the master key MK as an input. Each random number is a random bit string.

One example of the function F_1 is a pseudorandom function.

The pseudorandom function is a cryptographical function and, when a key is defined, deterministically returns a random number in accordance with an input value.

The function F_1 may be a cryptographical hash function such as SHA-1 or a function of common key cryptography such as AES.

One random number of the two random numbers generated by the function F_1 is the data key DK. The data key DK can be represented as follows.

$$DK = F\_1(MK, 1)$$

The other random number of the two random numbers generated by the function F_1 is the tag key TK. The tag key TK can be represented as follows.

$$TK = F\_1(MK, 2)$$

A set of the data key DK and the tag key TK is referred to as a "registration key EK". The registration key EK can be represented as follows.

$$EK = (DK, TK)$$

At step S133, the generation unit 320 stores the registration key EK in the storage unit 390. With this, the registration key EK is retained in the storage unit 390.

At step S134, the output unit 330 outputs the registration key EK.

For example, the output unit 330 transmits the registration key EK to each of the user key device 400 and the registration device 500 by using the communication device 305.

Figure 11:
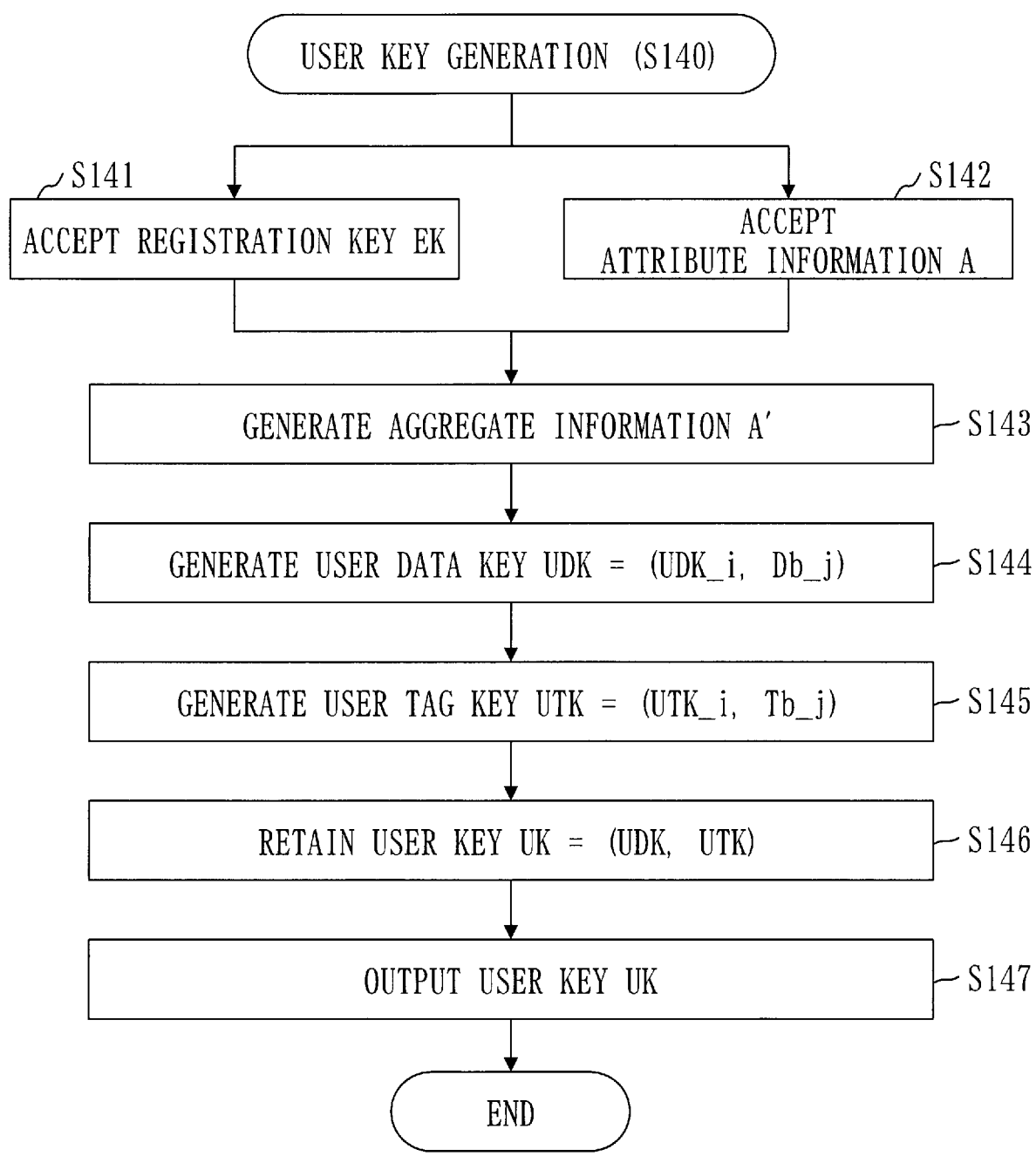
FIG. 11 is a flowchart of user key generation (S140) in Embodiment 1.

Based on FIG. 11, user key generation (S140) is described.

User key generation (S140) is a process to be performed by the user key device 400.

At step S141, the accepting unit 410 accepts the registration key EK.

For example, the accepting unit 410 receives the registration key EK from the registration key device 300 by using the communication device 405. The accepting unit 410 may accept the registration key EK inputted to the user key device 400 via the input/output interface 404.

Then, the accepting unit 410 stores the registration key EK in the storage unit 490. With this, the registration key EK is retained in the storage unit 490.

If the registration key EK has already been retained in the storage unit 490, step S141 is not required.

The registration key EK has the data key DK and the tag key TK.

At step S142, the accepting unit 410 accepts attribute information A.

For example, the accepting unit 410 accepts the attribute information A inputted to the user key device 400 via the input/output interface 404. The accepting unit 410 may accept the attribute information A from an application program executed in the user key device 400.

The attribute information A is attribute information of a searcher.

The searcher is a user of the search operation device 600, and searches for ciphertext C'.

The user has a plurality of attributes forming a hierarchy.

The attribute information indicates a plurality of attribute values corresponding to the plurality of attributes.

Each attribute value identifies an attribute of the user in each layer.

Based on FIG. 12, examples of the attribute information are described.

The attribute information indicates four attribute values corresponding to four layers.

An attribute of a first layer (first attribute) is a division.
An attribute of a second layer (second attribute) is a department.
An attribute of a third layer (third attribute) is a section.
An attribute of a fourth layer (fourth attribute) is a name.

Attribute information with number 1 is attribute information of Mr. Ne. Mr. Ne belongs to Sc section of De department of Di division.

Attribute information with number 2 is attribute information of Mrs. Nf. Mrs. Nf belongs to Sd section of De department of Di division.

Attribute information with number 3 is attribute information of a person in Sc section. The person in Sc section belongs to Sc section of De department of Di division. Since the fourth attribute value is a wildcard "*", the name is not restrictive.

Attribute information with number 4 is attribute information of a person in De department. The person in De department belongs to De department of Di division. Since the third attribute value and the fourth attribute value are wildcards "*", the section and the name are not restrictive.

Returning to FIG. 11, description of step S142 continues.

The number of layers of the hierarchy for representing the attributes of the user is denoted as "L". L is an integer equal to or more than 2.

The attribute information indicates L attribute values.

The attribute information A can be represented as follows.

$$A = (A\_1, \ldots, A\_L)$$

The attribute information A relates to search and decoding authority control.

Specifically, by using data based on the attribute information A, search authority and decoding authority are set.

The attribute information A may be two pieces of attribute information: attribute information for search authority and attribute information for decoding authority.

At step S143, the aggregate information generation unit 421 aggregates the plurality of attribute values included in the attribute information A into one set or more of blocks. With this, aggregate information A' is generated.

The aggregate information A' is the attribute information A after aggregation.

Each block of the aggregate information A' is configured of one or more attribute values.

The value indicated by each block of the aggregate information A' is referred to as an aggregate value.

Based on FIG. 13, examples of aggregate information obtained by aggregating attribute information (refer to FIG. 12) are described. "|" is a sign meaning concatenation.

The first element of the aggregate information is one with the first attribute and the second attribute concatenated together.

The second element of the aggregate information is one with the third attribute and the fourth attribute concatenated together.

Aggregate information with number 1 is aggregate information of Mr. Ne.

The attribute information of Mr. Ne (refer to FIG. 12) is (Di, De, Sc, Ne).

The aggregate information of Mr. Ne (refer to FIG. 13) is (Di|De, Sc|Ne).

The first attribute value Di and the second attribute value De are concatenated together to be aggregated to one character string Di|De.

The third attribute value Sc and the fourth attribute value Ne are concatenated together to be aggregated to one character string Sc|Ne.

Other aggregate information is represented also in a manner similar to that of the aggregate information with number 1.

Returning to FIG. 11, description of step S143 continues.

The number of layers after aggregation of hierarchy for representing the attributes of the user is denoted as "k". k is an integer equal to or more than 1.

The aggregate information indicates k aggregate values.

The aggregate value is a value obtained by aggregating one or more attribute values. Specifically, the aggregate value is a character string obtained by concatenating one or more attribute values.

The aggregate information A' can be represented as follows. m is an integer equal to or more than 1. $i\_1, \ldots, i\_m$ are positive integers.

$$A'=(A'\_1, \ldots, A'\_k)$$

$$A'\_i = A\_(i\_1) | A\_(i\_2) | \ldots A\_(i\_m)$$

$i\_1 < \ldots < i\_m$ and $i\_1+1=i\_2, i\_2+1=i\_3, \ldots, i\_(m-1)+1=i\_m, i\_m+1=(i+1)\_1$ hold true.

Here, the attribute information with number 1 in FIG. 12 is referred to as attribute information A1.

Also, the aggregate information with number 1 in FIG. 13 is referred to as aggregate information A1'.

The aggregate information A1' can be represented as follows.

$$A1'=(A1'\_1, A1'\_2)=(A1\_1 | A1\_2, A1\_3 | A1\_4)=(Di|De, Sc|Ne)$$

There is no restriction on an aggregation method. However, in the secret search system 100, one aggregation method is used. That is, the user key device 400 and other devices use the same aggregation method.

At step S144, the user key generation unit 422 generates a user data key UDK by using the data key DK, the attribute information A, and the aggregate information A'.

The data key DK is included in the registration key EK.

The user data key UDK has a data attribute key UDK_i and a flag value Db_j.

i is an integer equal to or more than 1 and equal to or less than k. j is an integer equal to or more than 1 and equal to or less than L.

The user key generation unit 422 calculates the data attribute key UDK_i as follows.

First, the user key generation unit 422 concatenates the aggregate value A'_i and the number i together. A value indicated by the obtained bit string is referred to as a concatenated value A'_i|i.

Then, the user key generation unit 422 executes a function F_2 by taking the data key DK and the concatenated value A'_i|i as inputs. The obtained value is the data attribute key UDK_i.

As with the function F_1, the function F_2 is a pseudo-random function, a hash function, or a function of common key cryptography.

The user key generation unit 422 determines the flag value Db_j as follows.

The user key generation unit 422 determines whether the attribute value A_j is the wildcard "*".

When the attribute value A_j is the wildcard "*", the flag value Db_j is 1.

When the attribute value A_j is not the wildcard "*", the flag value Db_j is 0.

The flag value Db_j indicates whether the attribute value A_j is the wildcard "*".

The user data key UDK can be represented as follows. i is an integer equal to or more than 1 and equal to or less than k. j is an integer equal to or more than 1 and equal to or less than L.

$$UDK=(UDK\_1, \ldots, UDK\_k, Db\_1, \ldots, Db\_L)$$

When $A\_j=*, Db\_j=1$

When $A\_j \neq *, Db\_j=0$ $$UDK\_i=F\_2(DK, A'\_i|i)$$

At step S145, the user key generation unit 422 generates a user tag key UTK by using the tag key TK, the attribute information A, and the aggregate information A'. The tag key TK is included in the registration key EK.

The user tag key UTK has a tag attribute key UTK_i and a flag value Tb_j.

i is an integer equal to or more than 1 and equal to or less than k. j is an integer equal to or more than 1 and equal to or less than L.

The user key generation unit 422 calculates the tag attribute key UTK_i as follows.

First, the user key generation unit 422 concatenates the aggregate value A'_i and the number i together. A value indicated by the obtained bit string is referred to as the concatenated value A'_i|i.

Then, the user key generation unit 422 executes the function F_2 by taking the tag key TK and the concatenated value A'_i|i as inputs. The obtained value is the tag attribute key UTK_i.

The user key generation unit 422 determines the flag value Tb_j as follows.

The user key generation unit 422 determines whether the attribute value A_j is the wildcard "*".

When the attribute value A_j is the wildcard "*", the flag value Tb_j is 1.

When the attribute value A_j is not the wildcard "*", the flag value Tb_j is 0.

The flag value Tb_j indicates whether the attribute value A_j is the wildcard "*".

The user tag key UTK can be represented as follows. i is an integer equal to or more than 1 and equal to or less than k. j is an integer equal to or more than 1 and equal to or less than L.

$$UTK=(UTK\_1, \ldots, UTK\_k, Tb\_1, \ldots, Tb\_L)$$

When $A\_j=*, Tb\_j=1$

When $A\_j \neq *, Tb\_j=0$ $$UTK\_i=F\_2(TK, A'\_i|i)$$

A set of the user data key UDK and the user tag key UTK is referred to as a "user key UK". The user key UK can be represented as follows.

$$UK=(UDK, UTK)$$

At step S146, the generation unit 420 stores the user key UK in the storage unit 490. With this, the user key UK is retained in the storage unit 490.

At step S147, the output unit 430 outputs the user key UK.

For example, the output unit 430 transmits the user key UK to the search operation device 600 by using the communication device 405.

Figure 14:
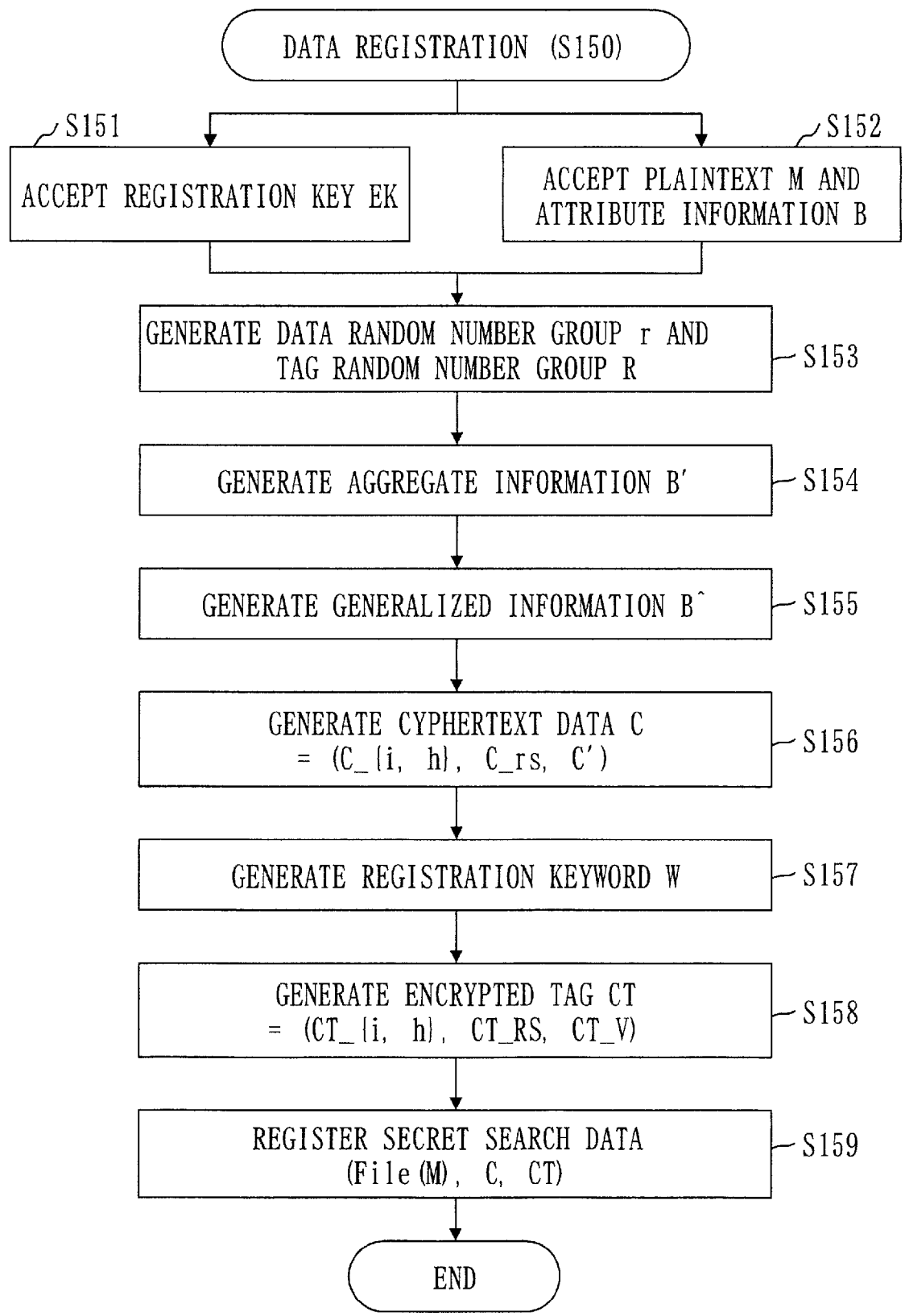
FIG. 14 is a flowchart of data registration (S150) in Embodiment 1.

Based on FIG. 14, data registration (S150) is described.

Data registration (S150) is a process to be performed by the registration device 500.

At step S151, the accepting unit 510 accepts the registration key EK.

For example, the accepting unit 510 receives the registration key EK from the registration key device 300 by using the communication device 505. The accepting unit 510 may accept the registration key EK inputted to the registration device 500 via the input/output interface 504.

Then, the accepting unit 510 stores the registration key EK in the storage unit 590. With this, the registration key EK is retained in the storage unit 590.

If the registration key EK has already been retained in the storage unit 590, step S151 is not required.

The registration key EK has the data key DK and the tag key TK.

At step S152, the accepting unit 510 accepts the plaintext M and attribute information B.

For example, the accepting unit 510 accepts the plaintext M and the attribute information B inputted to the registration device 500 via the input/output interface 504. The accepting unit 510 may accept the plaintext M and the attribute information B from an application program executed in the registration device 500.

The plaintext M is unencrypted data.

In the plaintext M, a file name File(M) is included as metadata.

The attribute information B is attribute information of an authorized person.

The authorized person is part of users of the search operation device 600, and has an authority of referring to the plaintext M.

For example, the attribute information B is attribute information illustrated in FIG. 12.

The attribute information B can be represented as follows.

$B=(B\_1, \ldots, B\_L)$

As with the attribute information A, the attribute information B relates to search and decoding authority control.

At step S153, the random number generation unit 521 generates a data random number group $r=(r\_1, \ldots, r\_k, rs)$ and a tag random number group $R=(R\_1, \ldots, R\_k, RS)$.

The data random number group r and the tag random number group R are each formed of (k+1) random numbers. The random numbers are each generated in a uniform random fashion.

At step S154, the aggregate information generation unit 522 aggregates the plurality of attribute values included in the attribute information B into one set or more of blocks. With this, aggregate information B' is generated.

The aggregate information B' is the attribute information B after aggregation.

Each block of the aggregate information B' is configured of one or more attribute values.

The value indicated by each block of the aggregate information B' is referred to as an aggregate value.

An aggregation method for the aggregate information B' is the same as the aggregate method for the aggregate information A' (refer to step S143 of FIG. 11).

For example, the aggregate information B' is aggregate information illustrated in FIG. 13.

The aggregate information B' can be represented as follows. m is an integer equal to or more than 1. $i\_1, \ldots, i\_m$ are positive integers.

$B'=(B'\_1, \ldots, B'\_k)$ $B'\_i=B\_(i\_1)|B\_(i\_2)| \ldots |B\_(i\_m)$ $i\_1< \ldots <i\_m$ and $i\_1+1=i\_2, i\_2+1=i\_3, \ldots, i\_(m-1)+1=i\_m, i\_m+1=(i+1)\_1$ hold true.

At step S155, the generalized information generation unit 523 generalizes each aggregate value included in the aggregate information B' by using the wildcard. With this, generalized information B^ is generated.

The generalized information B^ indicates a plurality of generalized values for the respective aggregate values.

Each generalized value is configured of zero or more wildcards replacing zero or more attribute values in the aggregate value and the remaining attribute values in the aggregate value.

Specifically, the generalized information generation unit 523 generates Ii generalized values B'\_i^ for an i-th aggregate value B'\_i included in the aggregate information B'.

$B'i^=B'\_i$ $=B\_(i\_1)|B\_(i\_2)| \ldots |B\_(i\_m)$ $B'\_i^1=*|B\_(i\_2)| \ldots |B\_(i\_m)$ $B'\_i^2=B\_(i\_1)*|B\_(i\_3)| \ldots |B\_(i\_m)$ $B'\_i^3=*|*|B\_(i\_3)| \ldots |B\_(i\_m)$ $B'\_i^4=B\_(i\_1)|B\_(i\_2)*|B\_(i\_4)| \ldots |B\_(i\_m)$ $\ldots$ $B'\_i^Ii=*|*| \ldots |*$ $Ii=2^{((i\_m)-(i\_1)+1)}$ Here, the aggregate information with number 1 in FIG. 13 is referred to as the aggregate information B'.

Also, a first aggregate value included in the aggregate information B' is referred to as an aggregate value B'\_1.

For the aggregate value B'\_1, the following four generalized values B'\_1^ are generated.

$B'\_1^0=B'\_1=Di|De$ $B'\_1^1=*|De$ $B'\_1^2=Di|*$ $B'\_1^3=*|*$

Here, a second aggregate value included in the aggregate information B' is referred to as an aggregate value B'\_2.

For the aggregate value B'\_2, the following four generalized values B'\_2^ are generated.

$B'\_2^0=B'\_2=Sc|Ne$ $B'\_2^1=*|Ne$ $B'\_2^2=Sc|*$ $B'\_2^3=|**$

Returning to FIG. 14, description continues from step S156.

At step S156, the ciphertext data generation unit 524 generates the ciphertext data C, by using the data key DK, the plaintext M, the attribute information B, the generalized information B^, and the data random number group r. The data key DK is included in the registration key EK.

The ciphertext data C has an attribute element C\_{i, h}, a random number element C\_rs, and the ciphertext C'.

i is an integer equal to or more than 1 and equal to or less than k. h is an integer equal to or more than 0 and equal to or less than $2^{((i\_m)-(i\_1)+1)}-1$.

The ciphertext data generation unit 524 calculates the attribute element C\_{i, h} as follows.

First, the ciphertext data generation unit 524 concatenates the generalized value B'_iˆh included in the generalized information Bˆ and the number i together. A value indicated by the obtained bit string is referred to as a concatenated value B'_iˆh|i.

Next, the ciphertext data generation unit 524 executes the function F_2 by taking the data key DK and the concatenated value B'_iˆh|i as inputs. The obtained value is referred to as a function value (DK, B'_iˆh|i).

Next, the ciphertext data generation unit 524 executes a function F_3 by taking the function value (DK, B'_iˆh|i) and a random number rs included in the data random number group r as inputs. The obtained value is referred to as a function value (DK, B'_iˆh|i, rs).

As with the function F_1 and the function F_2, the function F_3 is a pseudorandom function, a hash function, or a function of common key cryptography.

Then, the ciphertext data generation unit 524 calculates exclusive OR of the function value (DK, B'_iˆh|i, rs) and a random number r_i included in the data random number group r. The obtained value is the attribute element C_{i, j}.

The ciphertext data generation unit 524 sets the random number rs included in the data random number group r as a random number element C_rs.

The ciphertext data generation unit 524 calculates the ciphertext C' as follows.

First, the ciphertext data generation unit 524 calculates exclusive OR of k random numbers (r_1, . . . , r_k) included in the data random number group r. The obtained value is referred to as a random number sum r+.

Next, the ciphertext data generation unit 524 executes a function F_4 by taking the random number sum r+ as an input. The obtained value is referred to as a function value (r+).

As with the function F_3, the function F_4 is a pseudorandom function, a hash function, or a function of common key cryptography.

Then, the ciphertext data generation unit 524 calculates exclusive OR of the function value (r+) and the plaintext M. The obtained value is the ciphertext C'.

The ciphertext C' is the encrypted plaintext M.

The ciphertext data C can be represented as follows. Note that (+) means exclusive OR (XOR) in Embodiment 1. i is an integer equal to or more than 1 and equal to or less than k. m is an integer equal to or more than 1.

$$C=((C\_\{1,0\},C\_\{1,1\},\ldots,C\_\{1,I1\}),(C\_\{2,0\}, C\_\{2,1\},\ldots,C\_\{2,I2\}),\ldots,(C\_\{k,0\},C\_\{k,1\},\ldots,C\_\{k,Ik\}),C\_rs,C')$$

$$C\_\{i,h\}=F\_3(F\_2(DK,B'\_iˆh|i),rs)(+)r\_i$$

$$C\_rs=rs$$

$$C'=F\_4(r\_1(+)\ldots(+)r\_k)(+)M$$

$$Ii=2^{((i\_m)-(i\_1)+1)}$$

At step S157, the keyword generation unit 525 generates a keyword regarding the plaintext M.

Specifically, the keyword generation unit 525 extracts a keyword from the plaintext M by performing morphological analysis, natural language processing, or the like on the plaintext M.

However, the keyword generation unit 525 may accept a keyword inputted to the registration device 500 via the input/output interface 504. Also, the keyword generation unit 525 may accept a keyword regarding the plaintext M from an application program executed in the registration device 500.

The keyword regarding the plaintext M is referred to as a "registration keyword W".

There may be a plurality of registration keywords W. When there are a plurality of registration keywords W, the encrypted tag CT is generated for each registration keyword W.

At step S158, the encrypted tag generation unit 526 generates the encrypted tag CT by using the tag key TK, the attribute information B, the generalized information Bˆ, the tag random number group R, and the registration keyword W. The tag key TK is included in the registration key EK.

The encrypted tag CT has an attribute element CT_{i, h}, a random number element CT_RS, and a verification element CT_V.

i is an integer equal to or more than 1 and equal to or less than k. h is an integer equal to or more than 0 and equal to or less than $2^{((i\_m)-(i\_1)+1)}-1$.

The encrypted tag generation unit 526 calculates the attribute element CT_{i, h} as follows.

First, the encrypted tag generation unit 526 concatenates the generalized value B'_iˆh included in the generalized information Bˆ and the number i together. A value indicated by the obtained bit string is referred to as a concatenated value B'_iˆh|i.

Next, the encrypted tag generation unit 526 executes the function F_2 by taking the tag key TK and the concatenated value B'_iˆh|i as inputs. The obtained value is referred to as a function value (TK, B'_iˆh|i).

Next, the encrypted tag generation unit 526 executes a function F_5 by taking the function value (TK, B'_iˆh|i) and a registration keyword W as inputs. The obtained value is referred to as a function value (TK, B'_iˆh|i, W).

As with the function F_1 and the function F_2, the function F_5 is a pseudorandom function, a hash function, or a function of common key cryptography.

Next, the encrypted tag generation unit 526 executes a function F_6 by taking the function value (TK, B'_iˆh|i, W) and the random number RS included in the tag random number group R as inputs. The obtained value is referred to as a function value (TK. B'_iˆh|i, W, RS).

As with the function F_5, the function F_6 is a pseudorandom function, a hash function, or a function of common key cryptography.

Then, the encrypted tag generation unit 526 calculates exclusive OR of the function value (TK, B'_iˆh|i, W, RS) and a random number R_i included in the tag random number group R. The obtained value is the attribute element CT_{i, h}.

The encrypted tag generation unit 526 sets the random number RS included in the tag random number group R as a random number element CT_RS.

The encrypted tag generation unit 526 calculates the verification element CT_V as follows.

First, the encrypted tag generation unit 526 calculates exclusive OR of k random numbers (R_1, . . . . R_k) included in the tag random number group R. The obtained value is referred to as a random number sum R+.

Then, the encrypted tag generation unit 526 executes the function F_7 by taking the random number sum R+ as an input. The obtained value is the verification element CT_V.

As with the function F_6, the function F_7 is a pseudorandom function, a hash function, or a function of common key cryptography.

The encrypted tag CT can be represented as follows. Note that (+) means exclusive OR (XOR) in Embodiment 1. i is an integer equal to or more than 1 and equal to or less than k. m is an integer equal to or more than 1.

$$CT=((CT\_\{1,0\},CT\_\{1,1\},\ldots,CT\_\{1,I1\}),(CT\_\{2,0\},CT\{2,1\},\ldots,CT\_\{2,I2\}),\ldots,(CT\_\{k,0\},CT\_\{k,1\},\ldots,CT\_\{k,Ik\}),CT\_RS,CT\_V)$$

$$CT\_\{i,h\}=F\_6(F\_5(F\_2(TK,B'\_i'h|i),W),RS)(+)R\_i$$

$$CT\_RS=RS$$

$$CT\_V=F\_7(R\_1(+)\ldots(+)R\_k)$$

$$Ii=2^{((i\_m)-(i\_1)+1)}$$

At step S159, the registration unit 530 registers a set of the file name File(M), the ciphertext data C, and the encrypted tag CT in a registration database 791 of the data management device 700.

The set of the file name File(M), the ciphertext data C, and the encrypted tag CT is referred to as "secret search data".

Based on FIG. 15, the registration database 791 is described.

The registration database 791 is a database for searching, and is stored in the storage unit 790 of the data management device 700.

In the registration database 791, the set of the file name File(M), the ciphertext data C, and the encrypted tag CT (secret search data) is registered.

Returning to FIG. 14, description of step S159 continues.

The secret search data is registered as follows.

The registration unit 530 transmits the secret search data to the data management device 700 by using the communication device 505. In the data management device 700, the accepting unit 710 receives the secret search data, and the managing unit 740 registers the secret search data in the registration database 791.

With this, the file name File(M), the ciphertext data C, and the encrypted tag CT are retained as being mutually associated with one another.

Figure 16:
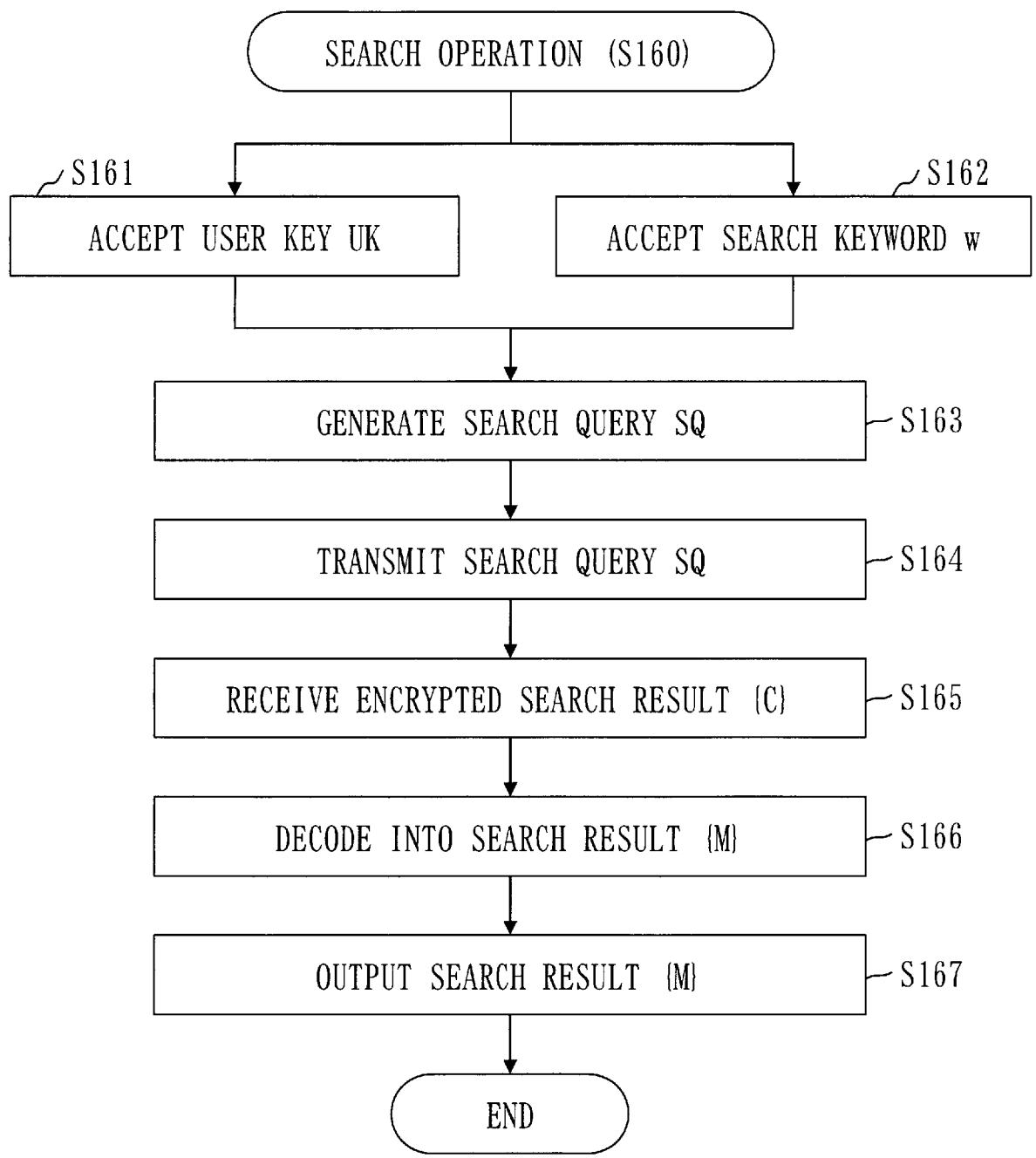
FIG. 16 is a flowchart of search operation (S160) in Embodiment 1.

Based on FIG. 16, search operation (S160) is described.

Search operation (S160) is a process to be performed by the search operation device 600.

At step S161, the accepting unit 610 accepts the user key UK.

For example, the accepting unit 610 receives the user key UK from the user key device 400 by using the communication device 605. The accepting unit 610 may accept the user key UK inputted to the search operation device 600 via the input/output interface 604.

Then, the accepting unit 610 stores the user key UK in the storage unit 690. With this, the user key UK is retained in the storage unit 690.

If the user key UK has already been retained in the storage unit 690, step S161 is not required.

The user key UK has the user data key UDK and the user tag key UTK.

At step S162, the accepting unit 610 accepts the search keyword w.

For example, the accepting unit 610 accepts the search keyword w inputted to the search operation device 600 via the input/output interface 604. The accepting unit 610 may accept the search keyword w from an application program executed in the search operation device 600.

At step S163, the generation unit 620 generates the search query SQ by using the user tag key UTK and the search keyword w. The user tag key UTK is included in the user key UK.

The user tag key UTK has k tag attribute keys {UTK_1, ..., UTK_k} and L flag values {Tb_1, ..., Tb_L} as follows.

$$UTK=(UTK\_1,\ldots,UTK\_k,Tb\_1,\ldots,Tb\_L)$$

L flag values {Tb_1, ..., Tb_L} are referred to as flag information Tb.

Figure 17:
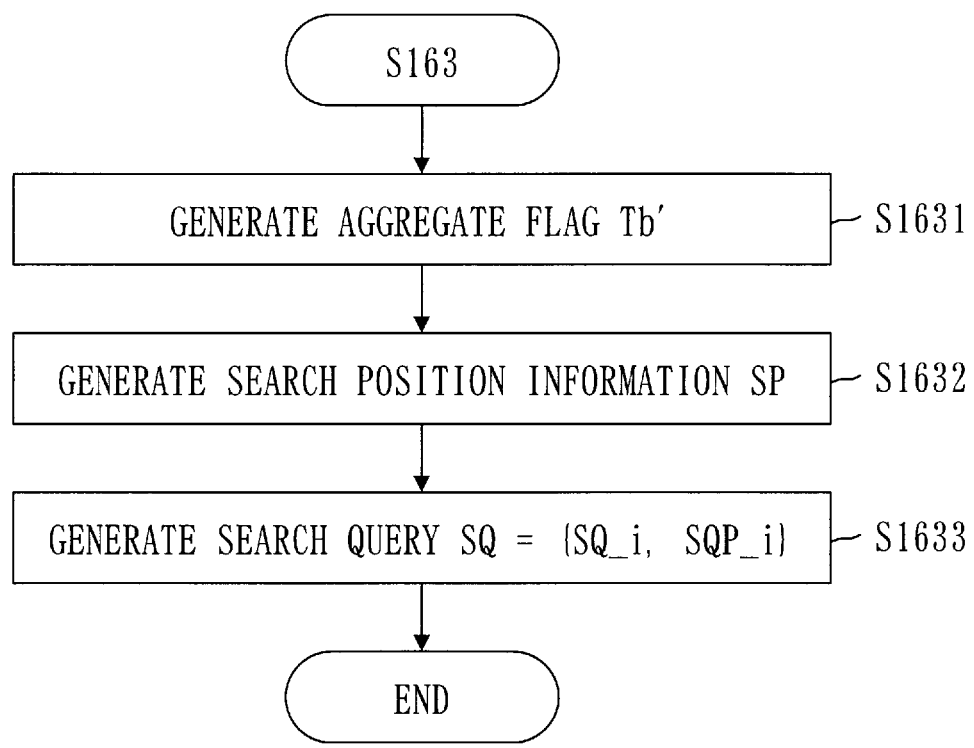
FIG. 17 is a flowchart of step S163 in Embodiment 1.

Based on FIG. 17, the procedure at step S163 is described.

At step S1631, the aggregate flag generation unit 621 aggregates the plurality of flag values included in the flag information Tb into one set or more of blocks. With this, an aggregate flag Tb' is generated.

The aggregate flag Tb' is the flag information Tb after aggregation.

Each block of the aggregate flag Tb' is configured of one or more flag values.

The value indicated by each block of the aggregate flag Tb' is referred to as an aggregate value.

An aggregation method for the aggregate flag Tb' is the same as the aggregation method for the aggregate information A' (refer to step S143 of FIG. 11) and the aggregate information B' (refer to step S154 of FIG. 14).

The aggregate flag Tb' can be represented as follows. m is an integer equal to or more than 1. i_1, ... i_m are positive integers.

$$Tb'=(Tb'\_1,\ldots,Tb'\_k)$$

$$Tb'\_i=(Tb\_(i\_1)|Tb\_(i\_2)|\ldots|Tb\_(i\_m)$$

$$i\_1<\ldots<i\_m \text{ and } i\_1+1=i\_2, i\_2+1=i\_3,\ldots,i\_(m-1)+1=i\_m, i\_m+1=(i+1)\_1 \text{ hold true.}$$

The aggregate flag Tb' has k aggregate values Tb'_i.

For example, the aggregate flag Tb1' corresponding to the aggregate information with number 1 (refer to FIG. 13) can be represented as follows.

$$Tb1'=(Tb1'\_1,Tb1'\_2)=(Tb1\_1|Tb1\_2,Tb1\_3|Tb1\_4)=(0|0,0|0)$$

For example, the aggregate flag Tb3' corresponding to the aggregate information with number 3 (refer to FIG. 13) can be represented as follows.

$$Tb3'=(Tb3'\_1,Tb3'\_2)=(Tb3\_1|Tb3\_2,Tb3\_3|Tb3\_4)=(0|0,0|1)$$

For example, the aggregate flag Tb4' corresponding to the aggregate information with number 4 (refer to FIG. 13) can be represented as follows.

$$Tb4'=(Tb4'\_1,Tb4'\_2)=(Tb4\_1|Tb4\_2,Tb4\_3|Tb4\_4)=(0|0,1|1)$$

At step S1632, the position information generation unit 622 generates the search position information SP by using the aggregate flag Tb'.

The search position information SP is information which identifies one or more attribute elements CT_{i, h} for use in searching among the plurality of attribute elements CT_ included in the encrypted tag CT.

Specifically, the search position information SP indicates one set or more of integers (i, h).

The search position information SP can be represented as follows.

$$SP=((1,SP1),\ldots,(k,SPk))$$

$$SP\_i=Tb'\_(i\_1)\times 2^0+Tb'\_(i\_2)\times 2^1+\ldots+Tb'\_(i\_m)\times 2^{((i\_m)-(i\_1)+1)}$$

For example, the aggregate flag Tb1' corresponding to the aggregate information with number 1 (refer to FIG. 13) can be represented as follows.

$$Tb1'=(Tb1'\_1,Tb1'\_2)=(Tb1\_1|Tb1\_2,Tb1\_3|Tb1\_4)=(0|0,0|0)$$

In this case, the search position information SP1 corresponding to the aggregate flag Tb1' can be represented as follows.

$$SP1=(SP1\_1,SP1\_2)$$

$$SP1\_1=0\times2^0+0\times2^1=0$$

$$SP1\_2=0\times2^0+0\times2^1=0$$

For example, the aggregate flag Tb3' corresponding to the aggregate information with number 3 (refer to FIG. 13) can be represented as follows.

$$Tb3'=(Tb3'\_1,Tb3'\_2)=(Tb3\_1|Tb3\_2,Tb3\_3|Tb3\_4)=(0|0,0|1)$$

In this case, the search position information SP3 corresponding to the aggregate flag Tb3' can be represented as follows.

$$SP3=(SP3\_1,SP3\_2)$$

$$SP3\_1=0\times2^0+0\times2^1=0$$

$$SP3\_2=0\times2^0+1\times2^1=2$$

For example, the aggregate flag Tb4' corresponding to the aggregate information with number 4 (refer to FIG. 13) can be represented as follows.

$$Tb4'=(Tb4'\_1,Tb4'\_2)=(Tb4\_1|Tb4\_2,Tb4\_3|Tb4\_4)=(0|0,1|1)$$

In this case, the search position information SP4 corresponding to the aggregate flag Tb4' can be represented as follows.

$$SP4=(SP4\_1,SP4\_2)$$

$$SP4\_1=0\times2^0+0\times2^1=0$$

$$SP4\_2=1\times2^0+1\times2^1=3$$

At step S1633, the search query generation unit 623 generates the search query SQ by using the tag attribute key UTK_i, the search keyword w, and the search position information SP.

The search query SQ has an attribute keyword element SQ_i and a search position element SQP_i.

The search query generation unit 623 calculates the attribute keyword element SQ_i as follows.

The search query generation unit 623 executes the function F_5 by taking the tag attribute key UTK_i and the search keyword w as inputs. The obtained value is the attribute keyword element SQ_i.

The attribute keyword element SQ_i is the encrypted search keyword w (encrypted keyword).

The search query generation unit 623 calculates the search position element SQP_i as follows.

The search query generation unit 623 extracts an i-th element SP_i from the search position information SP. The extracted element SP_i is the search position element SQP_i.

The search query SQ can be represented as follows. i is an integer equal to or more than 1 and equal to or less than k.

$$SQ=((SQ\_1,SQP\_1),\ldots,(SQ\_k,SQP\_k))$$

$$SQ\_i=F\_5(UTK\_i,w)$$

$$SQP\_i=SP\_i$$

Returning to FIG. 16, description continues from step S164.

At step S164, the requesting unit 630 transmits the search query SQ to the data management device 700 by using the communication device 605.

At step S165, the requesting unit 630 receives the encrypted search result {C} from the data management device 700 by using the communication device 605.

The encrypted search result {C} is a set of the ciphertext data C matching the search query SQ.

If the encrypted search result {C} does not have the ciphertext data C, that is, if there is no ciphertext data C hit in the search using the search query SQ, step S166 is not required.

At step S166, the decoding unit 640 decodes the encrypted search result {C} into the search result {M} by using the user data key UDK. The user data key UDK is included in the user key UK.

The search result {M} is a set of the plaintext M matching the search query SQ.

The user data key UDK has k data attribute keys {UDK_1 ..., UDK_k} and L flag values {Db_1, ..., Db_L} as follows.

$$UDK=(UDK\_1,\ldots,UDK\_k,Db\_1,\ldots,Db\_L)$$

L flag values {Db_1, ..., Db_L} are referred to as flag information Db.

Figure 18:
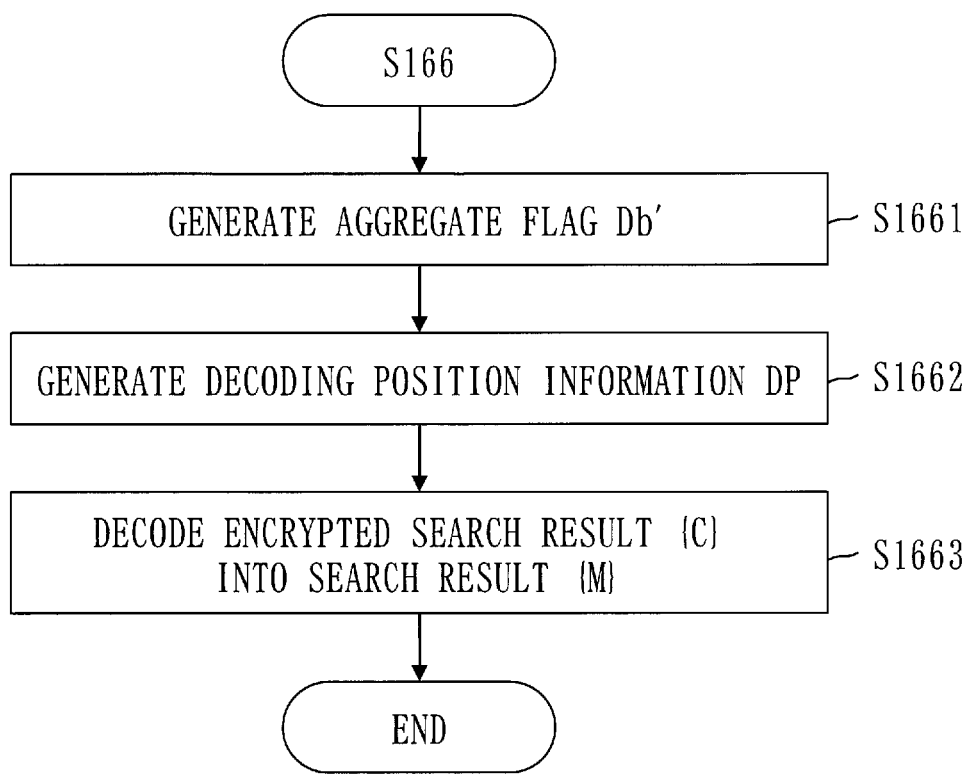
FIG. 18 is a flowchart of step S166 in Embodiment 1.

Based on FIG. 18, the procedure at step S166 is described.

At step S1661, the aggregate flag generation unit 641 aggregates the plurality of flag values included in the flag information Db into one set or more of blocks. With this, an aggregate flag Db' is generated.

The aggregate flag Db' is the flag information Db after aggregation.

Each block of the aggregate flag Db' is configured of one or more flag values.

The value indicated by each block of the aggregate flag Db' is referred to as an aggregate value.

An aggregation method for the aggregate flag Db' is the same as that for the aggregate flag Tb' (refer to step S1631 of FIG. 17).

The aggregate flag Db' can be represented as follows. m is an integer equal to or more than 1. i_1, ..., i_m are positive integers.

$$Db'=(Db'\_1,\ldots,Db'\_k)$$

$$Db'i=(Db\_(i\_1)|Db(i\_2)|\ldots|Db\_(i\_m))$$

$$i\_1<\ldots<i\_m \text{ and } i\_1+1=i\_2,i\_2+1=i\_3,\ldots,i\_(m-1)+1=i\_m,i\_m+1=(i+1)\_1 \text{ hold true.}$$

The aggregate flag Db' has k aggregate values Db'_i.

At step S1662, the position information generation unit 642 generates decoding position information DP by using the aggregate flag Db'.

The decoding position information DP is information which identifies the attribute element C_{i, h} for use in decoding among the plurality of attribute elements C_ included in the ciphertext data C.

Specifically, the decoding position information DP indicates one set or more of integers (i, h).

The decoding position information DP can be represented as follows.

$$DP=((1, DP\_1), \ldots, (k, DP\_k))$$

$$DP\_i = Db'\_(i\_1) \times 2^0 + Db'\_(i\_2) \times 2^1 + \ldots + Db'\_(i\_m) \times 2^{((i\_m)-(i\_1)+1)}$$

At step S1663, the search result decoding unit 643 decodes the encrypted search result {C} into the search result {M} by using the user data key UDK and the decoding position information DP.

Specifically, the search result decoding unit 643 decodes each ciphertext data C of the encrypted search result {C} into the plaintext M.

The decoding unit 640 decodes each piece of ciphertext data C into the plaintext M as follows.

First, the decoding unit 640 executes the function F_3 by taking the data attribute key UDK_i included in the user data key UDK and the random number element C_rs included in the ciphertext data C as inputs. The obtained value is referred to as a function value (UDK_i, C_rs).

Next, the decoding unit 640 selects k attribute elements (C{1, DP_1}, . . . C_{k, DP_k}) from the ciphertext data C. DP_i is a value included in the decoding position information DP.

Next, the decoding unit 640 calculates exclusive OR of the function value (UDK_i, C_rs) and the attribute element C_{i, DP_i}. The obtained value is referred to as an extracted random number r_i^.

Next, the decoding unit 640 calculates exclusive OR of k extracted random numbers (r_1^, . . . , r_k^). The obtained value is referred to as a random number sum r^+.

Next, the decoding unit 640 executes the function F_4 by taking the random number sum r^+ as an input. The obtained value is referred to as a function value (r^+).

Then, the decoding unit 640 calculates exclusive OR of the function value (r^+) and the ciphertext C' included in the ciphertext data C. The obtained value is the plaintext M.

The plaintext M can be represented as follows. i is an integer equal to or more than 1 and equal to or less than k.

$$M = F\_4(r\_1\hat{\ }(+) \ldots (+) r\_k\hat{\ })(+)C'$$

$$r\_i\hat{\ } = F\_3(UDK\_i, C\_rs)(+)C\_\{i, DP\_i\}$$

Returning to FIG. 16, step S167 is described.

At step S167, the output unit 650 outputs a search result {M}.

For example, the output unit 650 displays the search result {M} on a display via the input/output interface 604.

If step S166 is not executed because the encrypted search result {C} does not have the ciphertext data C, the search result {M} is not obtained.

If the search result {M} is not obtained, the output unit 650 outputs a search error message in place of the search result {M}.

The search error message indicates that there is no plaintext M hit in the secret search.

Figure 19:
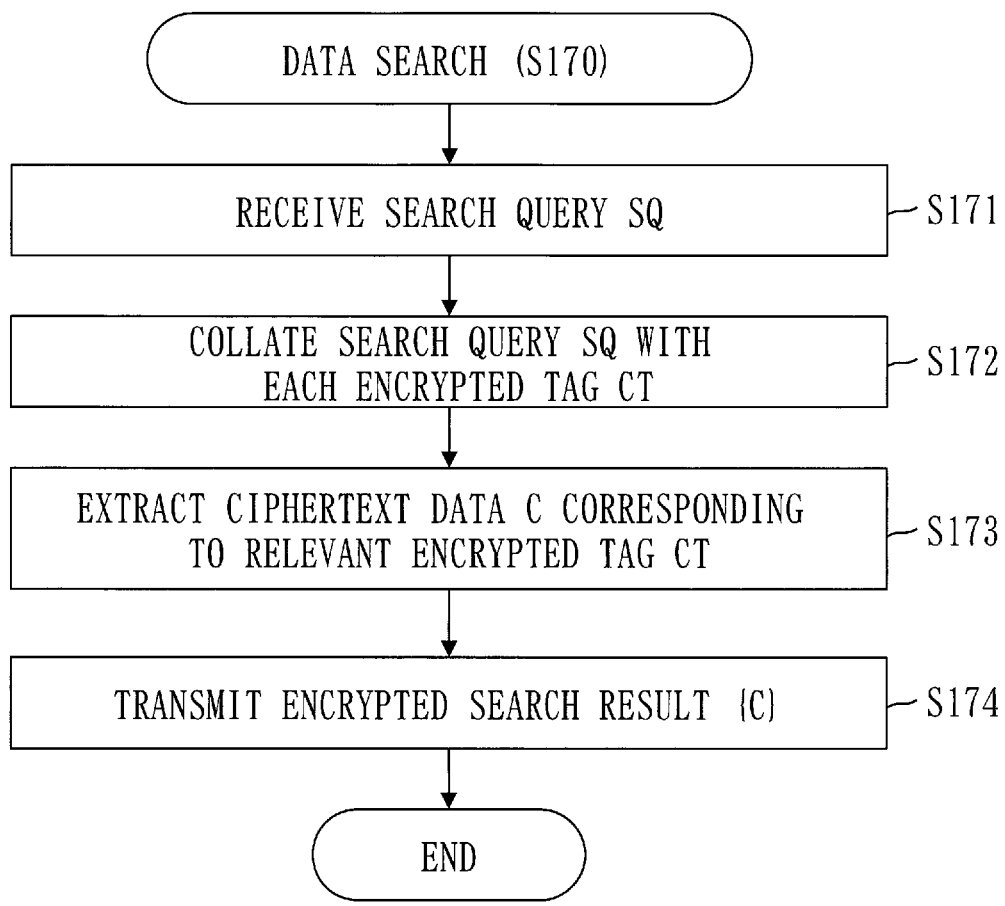
FIG. 19 is a flowchart of data search (S170) in Embodiment 1.

Based on FIG. 19, data search (S170) is described.

Data search (S170) is a process to be performed by the data management device 700.

At step S171, the accepting unit 710 receives the search query SQ from the search operation device 600 by using the communication device 705.

At step S172, the collating unit 721 collates the search query SQ with each encrypted tag CT, thereby selecting the encrypted tag CT matching the search query SQ.

Each encrypted tag CT matching the search query SQ is referred to as a "relevant encrypted tag CT".

Specifically, the collating unit 721 collates the search query SQ with each encrypted tag CT as follows.

First, the collating unit 721 selects k attribute elements (CT_{1, SQP_1}, . . . , CT_{k, SQP_k}) from the encrypted tag CT. SQP_i is an element included in the search query SQ.

Next, the collating unit 721 executes the function F_6 by taking the attribute keyword element SQ_i included in the search query SQ and the random number element CT_RS included in the encrypted tag CT as inputs. The obtained value is referred to as a function value (SQ_i, CT_RS).

Next, the collating unit 721 calculates exclusive OR of the function value (SQ_i, CT_RS) and the attribute element CT_{i, SQP_i}. The obtained value is referred to as an extracted random number R_i^.

Next, the collating unit 721 calculates exclusive OR of k extracted random numbers (R_1^, . . . , R_k^). The obtained value is referred to as a random number sum R^+.

Next, the collating unit 721 executes the function F_7 by taking the random number sum R^+ as an input. The obtained value is referred to as a function value (R^+).

Then, the collating unit 721 compares the function value (R^+) with the verification element CT_V included in the encrypted tag CT.

Matching of the function value (R^+) and the verification element CT_V means that the registration keyword W embedded in the encrypted tag CT matches the attribute information A and the search keyword w embedded in the search query SQ matches the attribute information B.

The encrypted tag CT having the verification element CT_V matching the function value (R^+) is the relevant encrypted tag CT.

Verification expressions can be represented as follows. i is an integer equal to or more than 1 and equal to or less than k.

$$CT\_V = F\_7(R\_1\hat{\ }(+) \ldots (+) R\_k\hat{\ })$$

$$R\_i\hat{\ } = F\_6(SQ\_i, CT\_RS)(+)CT\_\{i, SQP\_i\}$$

At step S173, the extracting unit 722 extracts the ciphertext data C corresponding to each relevant encrypted tag CT. The extracted ciphertext data C is referred to as relevant ciphertext data C.

At step S174, the output unit 730 transmits the encrypted search result {C} to the search operation device 600 by using the communication device 705.

The encrypted search result {C} is a set of the relevant ciphertext data C.

Figure 20:
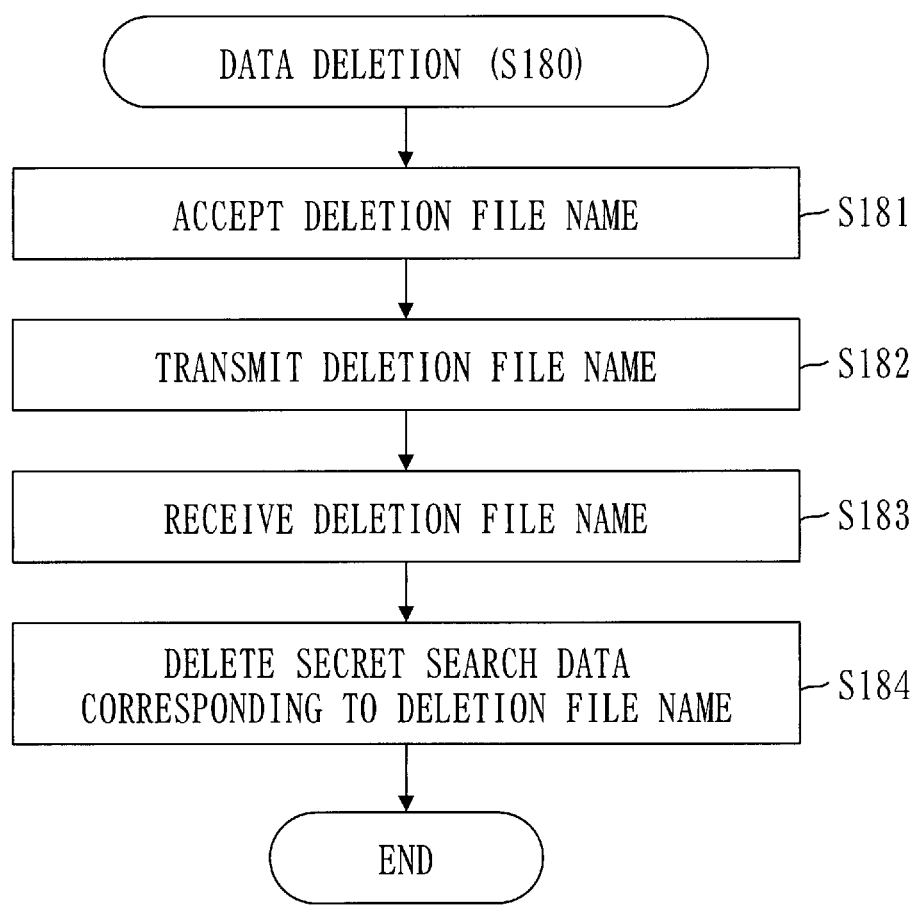
FIG. 20 is a flowchart of data deletion (S180) in Embodiment 1.

Based on FIG. 20, data deletion (S180) is described.

Data deletion (S180) is a process to be performed by the registration device 500 and the data management device 700. However, the search operation device 600 may operate in place of the registration device 500.

At step S181, the accepting unit 510 of the registration device 500 accepts a deletion file name. For example, the file name File(M) in the plaintext M obtained by the search operation (S160) is used as a deletion file name.

For example, the accepting unit 510 accepts the deletion file name inputted to the registration device 500 via the input/output interface 504. The accepting unit 510 may accept the deletion file name from an application program executed in the registration device 500.

However, the accepting unit 610 of the search operation device 600 may accept the deletion file name.

At step S182, the registration unit 530 of the registration device 500 transmits the deletion file name to the data management device 700 by using the communication device 505.

However, the output unit 650 of the search operation device 600 may transmit the deletion file name to the data management device 700 by using the communication device 605.

At step S183, the accepting unit 710 of the data management device 700 receives the deletion file name by using the communication device 705.

At step S184, the managing unit 740 of the data management device 70) deletes secret search data corresponding to the deletion file name from the registration database 791.

The secret search data corresponding to the deletion file name has the same file name File(M) as the deletion file name.

Effects of Embodiment 1

By Embodiment 1, effects as follows are achieved.

A keyword search can be conducted without decoding ciphertext.

A key different for each piece of attribute information of the users can be generated. Thus, a multiuser-type common key scheme can be configured.

Authority of decoding ciphertext can be controlled by using the key of the user. Since the attribute information included in the key is resistant to separation, resistance against coalition attacks by a plurality of authorized users can be improved. That is, safety of the multiuser-type common key scheme can be improved.

After the plurality of attribute values in the attribute information is aggregated into some blocks, a key is generated. With this, the key length can be suppressed so as not to be proportional to the attribute information.

By generating the search position information and the decoding position information, searching and decoding can be made efficient.

By Embodiment 1, effects as follows are achieved.

The user key device 400 irreversibly converts data obtained by aggregating the attribute information into several portions for vectorization (aggregate information, generalized information) to generate a user key.

The registration device 500 generates ciphertext data and an encrypted tag by using this user key.

The search operation device 600 generates a search query by using this user key.

With this, safety of a multiuser-type common key scheme is improved against coalition attacks.

Supplement to Embodiment 1

Figure 21:
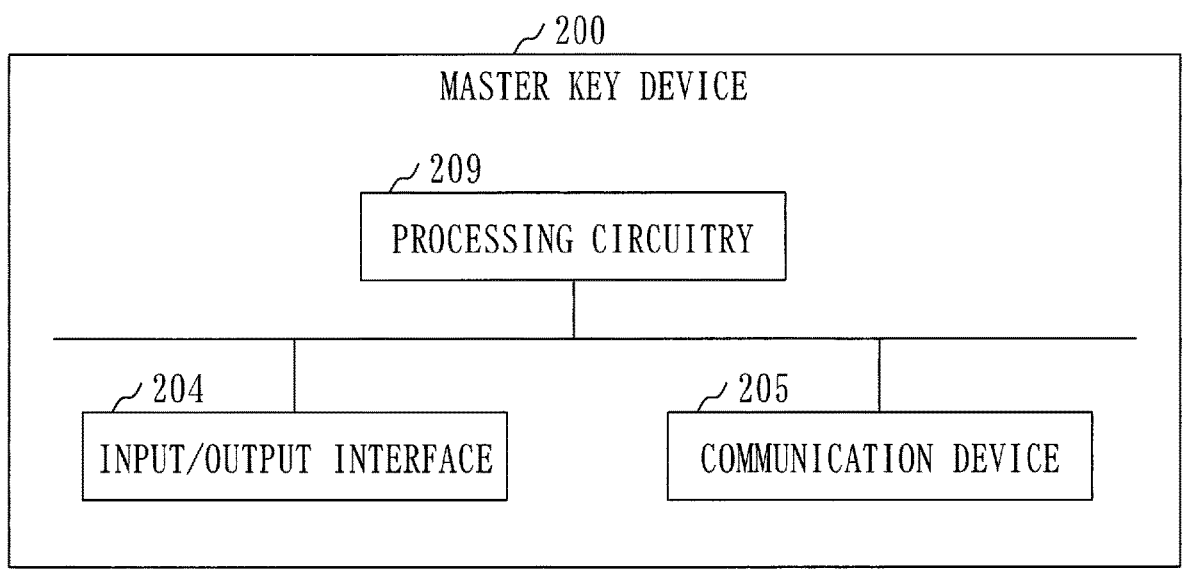
FIG. 21 is a hardware structure diagram of the master key device 200 in Embodiment 1.

Based on FIG. 21, the hardware structure of the master key device 200 is described.

The master key device 200 includes a processing circuitry 209.

The processing circuitry 209 is hardware achieving the accepting unit 210, the generation unit 220, and the output unit 230.

The processing circuitry 209 may be dedicated hardware or may be the processor 201 which executes a program stored in the memory 202.

When the processing circuitry 209 is dedicated hardware, the processing circuitry 209 is, for example, a single circuit, composite circuit, programmed processor, parallel-programmed processor, ASIC, FPGA, or a combination of these.

ASIC is an abbreviation for Application Specific Integrated Circuit.

FPGA is an abbreviation for Field Programmable Gate Array.

The master key device 200 may include a plurality of processing circuits which replace the processing circuitry 209. The plurality of processing circuits share the functions of the processing circuitry 209.

In the processing circuitry 209, part of the functions may be implemented by dedicated hardware and the remaining functions may be implemented by software or firmware.

In this manner, the functions of the master key device 200 can be achieved by hardware, software, firmware, or a combination of these.

Figure 22:
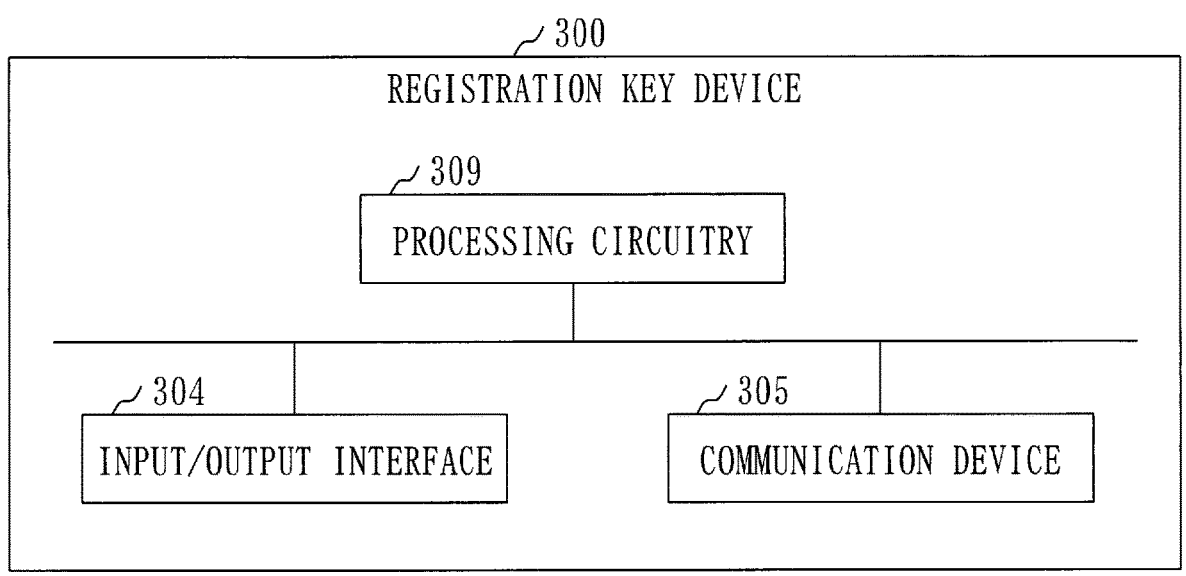
FIG. 22 is a hardware structure diagram of the registration key device 300 in Embodiment 1.

Based on FIG. 22, the hardware structure of the registration key device 300 is described.

The registration key device 300 includes a processing circuitry 309.

The processing circuitry 309 is hardware achieving the accepting unit 310, the generation unit 320, and the output unit 330.

The processing circuitry 309 may be dedicated hardware or may be the processor 301 which executes a program stored in the memory 302.

When the processing circuitry 309 is dedicated hardware, the processing circuitry 309 is, for example, a single circuit, composite circuit, programmed processor, parallel-programmed processor, ASIC, FPGA, or a combination of these.

The registration key device 300 may include a plurality of processing circuits which replace the processing circuitry 309. The plurality of processing circuits share the functions of the processing circuitry 309.

In the processing circuitry 309, part of the functions may be implemented by dedicated hardware and the remaining functions may be implemented by software or firmware.

In this manner, the functions of the registration key device 300 can be achieved by hardware, software, firmware, or a combination of these.

Figure 23:
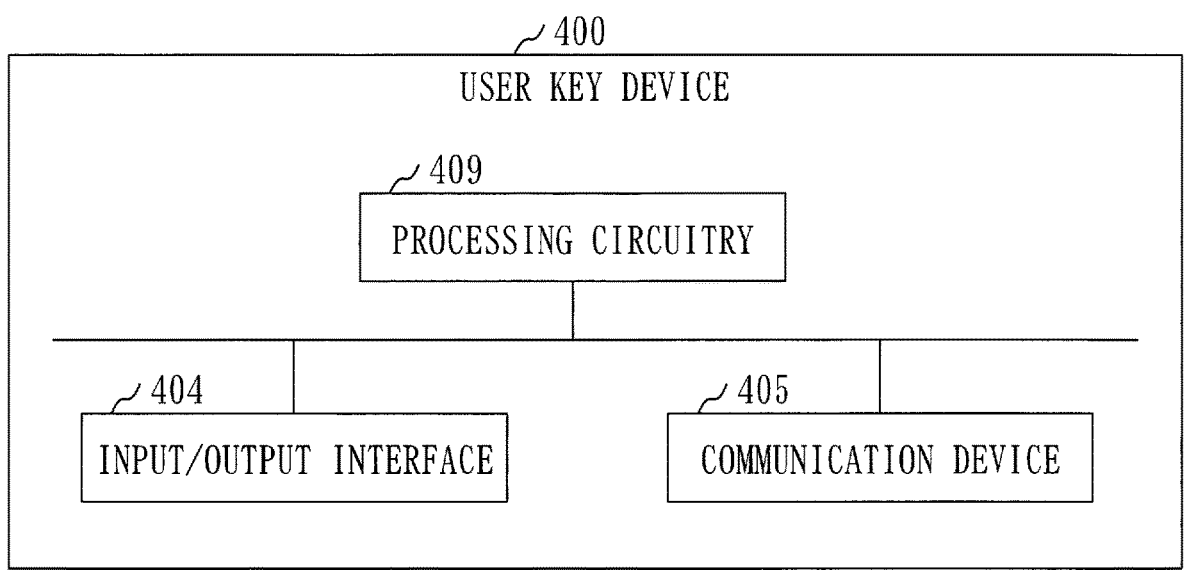
FIG. 23 is a hardware structure diagram of the user key device 400 in Embodiment 1.

Based on FIG. 23, the hardware structure of the user key device 400 is described.

The user key device 400 includes a processing circuitry 409.

The processing circuitry 409 is hardware achieving the accepting unit 410, the generation unit 420, and the output unit 430.

The processing circuitry 409 may be dedicated hardware or may be the processor 401 which executes a program stored in the memory 402.

When the processing circuitry 409 is dedicated hardware, the processing circuitry 409 is, for example, a single circuit, composite circuit, programmed processor, parallel-programmed processor, ASIC, FPGA, or a combination of these.

The user key device 400 may include a plurality of processing circuits which replace the processing circuitry 409. The plurality of processing circuits share the functions of the processing circuitry 409.

In the processing circuitry 409, part of the functions may be implemented by dedicated hardware and the remaining functions may be implemented by software or firmware.

In this manner, the functions of the user key device 400 can be achieved by hardware, software, firmware, or a combination of these.

Figure 24:
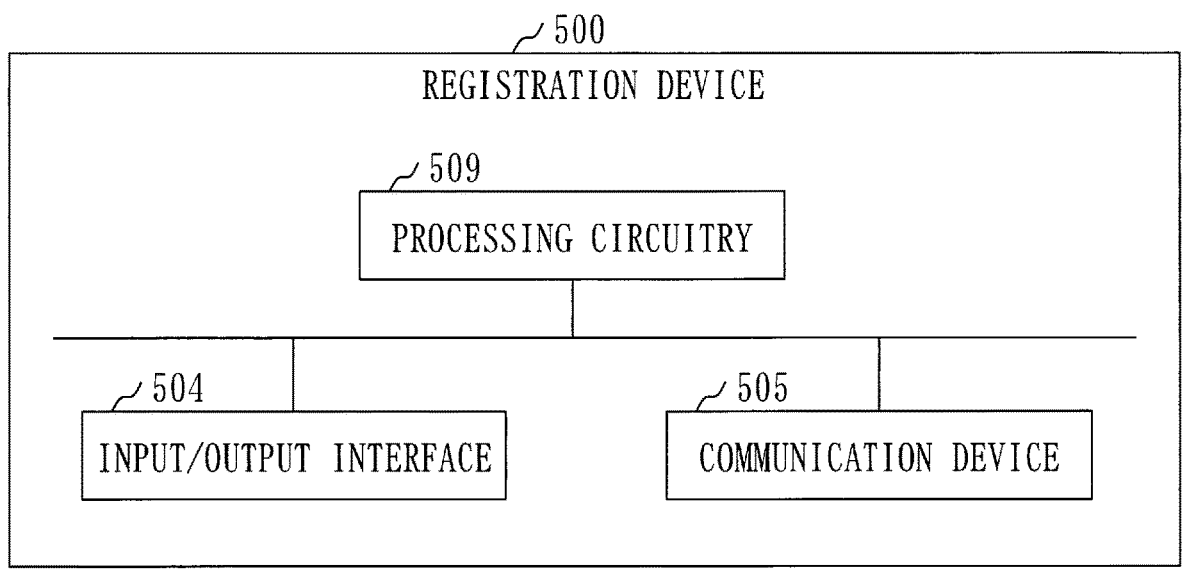
FIG. 24 is a hardware structure diagram of the registration device 500 in Embodiment 1.

Based on FIG. 24, the hardware structure of the registration device 500 is described.

The registration device 500 includes a processing circuitry 509.

The processing circuitry 509 is hardware achieving the accepting unit 510, the generation unit 520, and the registration unit 530.

The processing circuitry 509 may be dedicated hardware or may be the processor 501 which executes a program stored in the memory 502.

When the processing circuitry 509 is dedicated hardware, the processing circuitry 509 is, for example, a single circuit, composite circuit, programmed processor, parallel-programmed processor, ASIC, FPGA, or a combination of these.

The registration device 500 may include a plurality of processing circuits which replace the processing circuitry 509. The plurality of processing circuits share the functions of the processing circuitry 509.

In the processing circuitry 509, part of the functions may be implemented by dedicated hardware and the remaining functions may be implemented by software or firmware.

In this manner, the functions of the registration device 500 can be achieved by hardware, software, firmware, or a combination of these.

Figure 25:
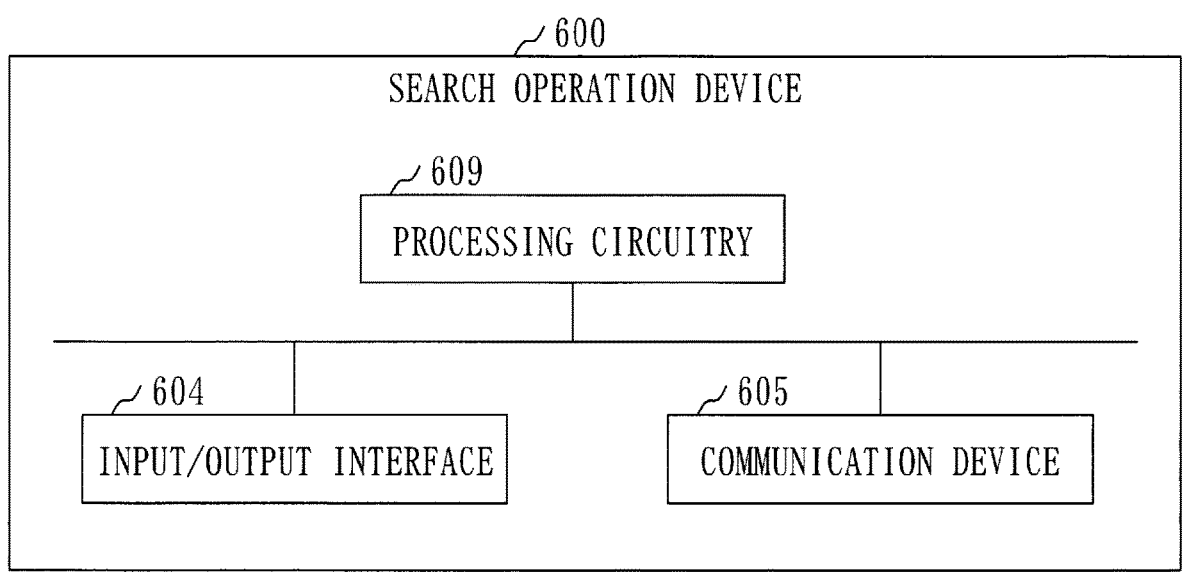
FIG. 25 is a hardware structure diagram of the search operation device 600 in Embodiment 1.

Based on FIG. 25, the hardware structure of the search operation device 600 is described.

The search operation device 600 includes a processing circuitry 609.

The processing circuitry 609 is hardware achieving the accepting unit 610, the generation unit 620, the requesting unit 630, the decoding unit 640, and the output unit 650.

The processing circuitry 609 may be dedicated hardware or may be the processor 601 which executes a program stored in the memory 602.

When the processing circuitry 609 is dedicated hardware, the processing circuitry 609 is, for example, a single circuit, composite circuit, programmed processor, parallel-programmed processor, ASIC, FPGA, or a combination of these.

The search operation device 600 may include a plurality of processing circuits which replace the processing circuitry 609. The plurality of processing circuits share the functions of the processing circuitry 609.

In the processing circuitry 609, part of the functions may be implemented by dedicated hardware and the remaining functions may be implemented by software or firmware.

In this manner, the functions of the search operation device 600 can be achieved by hardware, software, firmware, or a combination of these.

Figure 26:
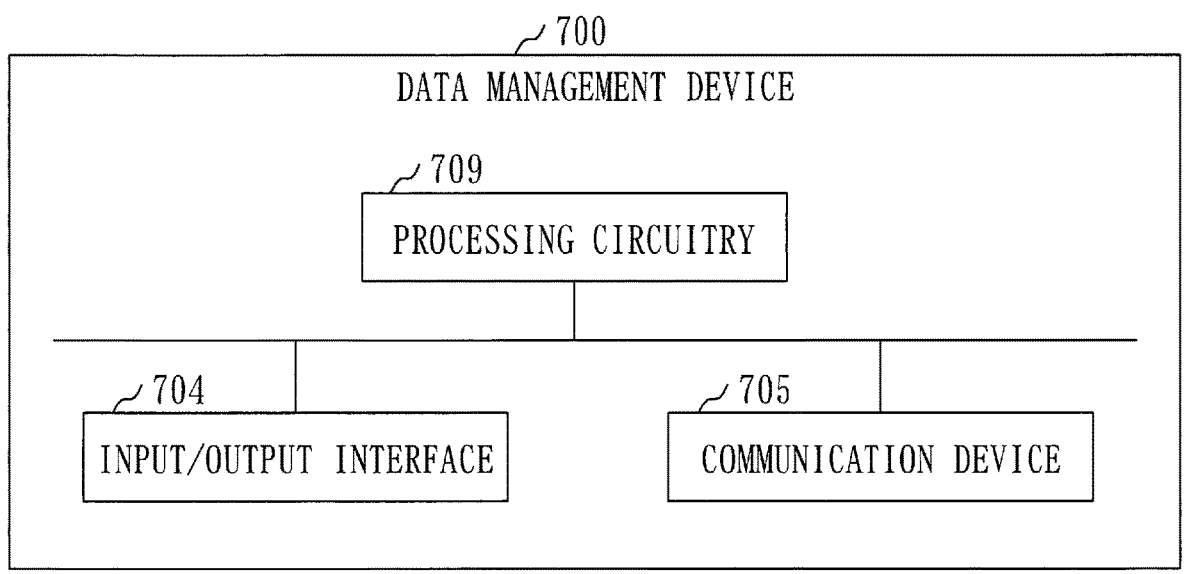
FIG. 26 is a hardware structure diagram of the data management device 700 in Embodiment 1.

Based on FIG. 26, the hardware structure of the data management device 700 is described.

The data management device 700 includes a processing circuitry 709.

The processing circuitry 709 is hardware achieving the accepting unit 710, the searching unit 720, the output unit 730, and the managing unit 740.

The processing circuitry 709 may be dedicated hardware or may be the processor 701 which executes a program stored in the memory 702.

When the processing circuitry 709 is dedicated hardware, the processing circuitry 709 is, for example, a single circuit, composite circuit, programmed processor, parallel-programmed processor, ASIC, FPGA, or a combination of these.

The data management device 700 may include a plurality of processing circuits which replace the processing circuitry 709. The plurality of processing circuits share the functions of the processing circuitry 709.

In the processing circuitry 709, part of the functions may be implemented by dedicated hardware and the remaining functions may be implemented by software or firmware.

In this manner, the functions of the data management device 700 can be achieved by hardware, software, firmware, or a combination of these.

Embodiment 1 exemplarily illustrates a preferable embodiment and is not intended to limit the technical scope of the present disclosure. Embodiment 1 may be implemented partially or in combination of other embodiments. The procedures described by using flowcharts and so forth may be changed as appropriate.

A "unit", which is a component of each device described in Embodiment 1, may be read as a "process" or "step".

REFERENCE SIGNS LIST

100: secret search system; 101: network; 200: master key device; 201: processor; 202: memory; 203: auxiliary storage device; 204: input/output interface; 205: communication device; 209: processing circuitry; 210: accepting unit; 220: generation unit; 230: output unit; 290: storage unit; 300: registration key device; 301: processor; 302: memory; 303: auxiliary storage device; 304: input/output interface; 305: communication device; 309: processing circuitry; 310: accepting unit; 320: generation unit; 330: output unit; 390: storage unit; 400: user key device; 401: processor; 402: memory; 403: auxiliary storage device; 404: input/output interface; 405: communication device; 409: processing circuitry; 410: accepting unit; 420: generation unit; 421: aggregate information generation unit; 422: user key generation unit; 430: output unit; 490: storage unit; 500: registration device; 501: processor; 502: memory; 503: auxiliary storage device; 504: input/output interface; 505: communication device; 509: processing circuitry; 510: accepting unit; 520: generation unit; 521: random number generation unit; 522: aggregate information generation unit; 523: generalized information generation unit; 524: ciphertext data generation unit; 525: keyword generation unit; 526: encrypted tag generation unit; 530: registration unit; 590: storage unit; 600: search operation device; 601: processor; 602: memory; 603: auxiliary storage device; 604: input/output interface; 605: communication device; 609: processing circuitry; 610: accepting unit; 620: generation unit; 621: aggregate flag generation unit; 622: position information generation unit; 623: search query generation unit; 630: requesting unit; 640: decoding unit; 641: aggregate flag generation unit; 642: position information generation unit; 643: search result decoding unit; 650: output unit; 690: storage unit; 700: data management device; 701: processor; 702: memory; 703: auxiliary storage device; 704: input/output interface; 705: communication device; 709: processing circuitry; 710: accepting unit; 720: searching unit; 721: collating unit; 722: extracting unit; 730: output unit; 740: managing unit; 790: storage unit; 791: registration database

The invention claimed is:

1. A search operation device comprising:
processing circuitry configured to:
    accept a search keyword and a user key; and
    generate a search query by using the search keyword and a user tag key included in the user key, wherein
    the user tag key has a plurality of flag values based on a plurality of attribute values which identify a plurality of attributes of a user and one or more tag attribute keys based on one or more aggregate values generated by aggregating the plurality of attribute values, and the processing circuitry further configured to:

generate a search-purpose aggregate flag indicating one or more aggregate values each configured of one or more flag values, by aggregating the plurality of flag values included in the user tag key, generate, by using the search-purpose aggregate flag, search position information which identifies one or more attribute elements for use in searching among a plurality of attribute elements included in an encrypted tag registered together with ciphertext data in a database, and generate the search query by using the search keyword, the one or more tag attribute keys included in the user tag key, and the search position information.

2. The search operation device according to claim 1, wherein the processing circuitry is further configured to: transmit the search query and receives an encrypted search result including ciphertext data matching the search query; and decode the ciphertext data included in the encrypted search result into plaintext by using a user data key included in the user key, wherein the user data key has a plurality of flag values based on the plurality of attribute values and one or more data attribute keys based on one or more aggregate values generated by aggregating the plurality of attribute values, and wherein the processing circuitry is further configured to:

generate a decoding-purpose aggregate flag indicating one or more aggregate values each configured of one or more flag values, by aggregating the plurality of flag values included in the user data key, generate, by using the decoding-purpose aggregate flag, decoding position information which identifies one or more attribute elements for use in decoding among a plurality of attribute elements included in the ciphertext data in the encrypted search result, and decode the ciphertext data included in the encrypted search result into the plaintext by using the one or more data attribute keys included in the user data key and the decoding position information.

* * * * *